(12) United States Patent
Pratt et al.

(10) Patent No.: US 9,158,002 B2
(45) Date of Patent: Oct. 13, 2015

(54) SATELLITE SUBSET SELECTION

(75) Inventors: Anthony Richard Pratt, Northamptonshire (GB); Murray Robert Jarvis, Stapleford (GB)

(73) Assignee: QUALCOMM Incorporated, San Diego, CA (US)

(*) Notice: Subject to any disclaimer, the term of this patent is extended or adjusted under 35 U.S.C. 154(b) by 670 days.

(21) Appl. No.: 13/344,494

(22) Filed: Jan. 5, 2012

(65) Prior Publication Data

US 2013/0002485 A1    Jan. 3, 2013

(30) Foreign Application Priority Data

Jan. 5, 2011    (GB) .................................. 1100115.3

(51) Int. Cl.
*G01S 19/28* (2010.01)
*G01S 5/02* (2010.01)
*G01S 19/42* (2010.01)

(52) U.S. Cl.
CPC ............... *G01S 19/28* (2013.01); *G01S 5/0242* (2013.01); *G01S 19/42* (2013.01)

(58) Field of Classification Search
CPC ........ G01S 19/28; G01S 19/258; G01S 19/42
USPC .................................................... 342/357.67
See application file for complete search history.

(56) References Cited

U.S. PATENT DOCUMENTS

| | | | |
|---|---|---|---|
| 4,928,107 A * | 5/1990 | Kuroda et al. ............ | 342/357.67 |
| 5,323,163 A * | 6/1994 | Maki ........................ | 342/357.48 |
| 5,552,794 A | 9/1996 | Colley | |
| 6,102,338 A | 8/2000 | Yoshikawa | |
| 6,191,731 B1 | 2/2001 | McBurney et al. | |
| 6,329,945 B1 * | 12/2001 | Hynes ....................... | 342/357.67 |
| 6,392,593 B1 | 5/2002 | Pemble | |
| 6,417,801 B1 | 7/2002 | Van Diggelen | |
| 6,650,288 B1 | 11/2003 | Pitt | |
| 6,720,915 B2 * | 4/2004 | Sheynblat ................. | 342/357.67 |
| 6,725,158 B1 | 4/2004 | Sullivan | |
| 6,727,850 B2 * | 4/2004 | Park et al. ................. | 342/357.25 |
| 6,734,821 B2 | 5/2004 | Van Diggelen | |
| 6,771,215 B2 | 8/2004 | Akopian | |

(Continued)

FOREIGN PATENT DOCUMENTS

| | | |
|---|---|---|
| EP | 0 353 849 A1 | 2/1990 |
| EP | 0 451 607 A2 | 10/1991 |

(Continued)

OTHER PUBLICATIONS

Peterson, et al., "GPS Receiver Structures for the Urban Canyon," pp. 1323-1332, Proceedings of the 8th International Technical Meeting of the Satellite Division of the Institute of Navigation (ION GPS 1995), Sep. 12-15, 1995, Palm Springs, CA.

(Continued)

*Primary Examiner* — Gregory C Issing

(57) ABSTRACT

Apparatus for calculating the location of a receiver by means of a location algorithm that generates a receiver location in dependence on signalling events received by that receiver from a set of satellites, the apparatus being arranged to select, from a constellation of satellites visible to the receiver, the set of satellites to use in the location algorithm in dependence on an effect that it is estimated using that set of satellites will have on the capability of the location algorithm to generate an accurate location for the receiver.

15 Claims, 13 Drawing Sheets

(56) References Cited

U.S. PATENT DOCUMENTS

| | | | |
|---|---|---|---|
| 6,917,330 B2* | 7/2005 | Ohmura et al. | 342/357.29 |
| 7,064,709 B1 | 6/2006 | Weisenburger et al. | |
| 7,095,368 B1 | 8/2006 | vanDiggelen | |
| 7,142,155 B2* | 11/2006 | Iwami | 342/357.25 |
| 7,152,015 B2* | 12/2006 | Manzen | 702/150 |
| 7,295,155 B2* | 11/2007 | Wakamatsu | 342/357.67 |
| 7,522,098 B2 | 4/2009 | Van Diggelen | |
| 7,847,728 B2* | 12/2010 | Thomson et al. | 342/357.42 |
| 7,961,142 B2 | 6/2011 | Nagahara | |
| 2003/0016172 A1 | 1/2003 | Natsume | |
| 2003/0197639 A1 | 10/2003 | Sheynblat | |
| 2003/0224802 A1 | 12/2003 | Nir | |
| 2004/0041729 A1 | 3/2004 | Rowitch | |
| 2004/0104840 A1 | 6/2004 | Awata | |
| 2004/0130485 A1 | 7/2004 | Rapoport | |
| 2004/0145518 A1 | 7/2004 | Toda | |
| 2005/0055160 A1 | 3/2005 | King | |
| 2005/0101248 A1 | 5/2005 | Vollath | |
| 2006/0055596 A1 | 3/2006 | Bryant | |
| 2007/0216572 A1 | 9/2007 | Schnabel | |
| 2007/0241958 A1 | 10/2007 | Nicholson | |
| 2008/0048910 A1 | 2/2008 | Wang | |
| 2008/0074317 A1 | 3/2008 | Harper et al. | |
| 2008/0291979 A1* | 11/2008 | Normark et al. | 375/147 |
| 2009/0040104 A1 | 2/2009 | Mitsunaga et al. | |
| 2009/0195446 A1 | 8/2009 | Liao et al. | |
| 2009/0195451 A1 | 8/2009 | Henkel | |
| 2009/0322607 A1 | 12/2009 | Mitsunaga | |
| 2010/0138147 A1 | 6/2010 | T'Siobbel | |
| 2010/0207810 A1 | 8/2010 | Terashima | |
| 2010/0302099 A1 | 12/2010 | Grossnickle | |
| 2011/0037646 A1 | 2/2011 | Tajima | |
| 2011/0068977 A1 | 3/2011 | Thomson | |
| 2011/0080318 A1 | 4/2011 | Alizadeh-Shabdiz | |
| 2011/0248887 A1 | 10/2011 | Whelan et al. | |
| 2012/0182181 A1 | 7/2012 | Dai | |

FOREIGN PATENT DOCUMENTS

| | | |
|---|---|---|
| WO | 00/58748 A1 | 10/2000 |
| WO | 2005081010 | 9/2005 |
| WO | WO 2008/040896 A2 | 4/2008 |
| WO | WO 2011/127450 A2 | 10/2011 |

OTHER PUBLICATIONS

Lannelongue, et al., "Fast Acquisition Techniques for G.P.S. Receivers," pp. 261-269, Proceedings of the 54th Annual Meeting of the Institute of Navigation, Jun. 1-3, 1998, Denver, CO.

Van Diggelen, "A-GPS: Assisted GPS, GNSS and SBAS 72," Chapter 4, Coarse-Time Navigation: Instant GPS, Artech House, Boston, 2009.

Copending U.S. Appl. No. 13/344,098 filed on Jan. 5, 2012.
Copending U.S. Appl. No. 13/344,297 filed on Jan. 5, 2012.
Copending U.S. Appl. No. 13/344,410 filed on Jan. 5, 2012.
Copending U.S. Appl. No. 13/344,524 filed on Jan. 5, 2012.
UK Search Report dated May 16, 2012, in corresponding UK application.
International Preliminary Report on Patentability for International Appln. No. PCT/EP2012/050137, dated Jul. 10, 2013.
International Search Report and Written Opinion of the International Searching Authority issued in PCT/EP2012/050136 dated May 25, 2012.
International Search Report issued in PCT/EP2012/050134 dated May 11, 2012.
UK Search Report dated May 14, 2012, in corresponding UK Application GB1105217.2.
UK Search Report dated May 18, 2012, in corresponding UK application GB1100117.9.
UK Search Report dated May 22, 2012, in corresponding UK Application GB 1100116.1.
Written Opinion for International Application No. PCT/EP2012/050137 dated Feb. 28, 2013.
Notice of Allowance for U.S. Appl. No. 13/344,098, dated Dec. 31, 2014.
GB Search and Examination Report issued in related GB Application No. GB1419325.4, dated Nov. 21, 2014.
Office Action dated Mar. 13, 2015, U.S. Appl. No. 13/344,297.
Office Action dated Mar. 2, 2015, U.S. Appl. No. 13/344,410.
UK Examination Report issued in UK Application No. GB1419325.4, dated Feb. 3, 2015.
Office Action mailed Sep. 2, 2015 in U.S. Appl. No. 13/344,297.
Office Action mailed Aug. 4, 2015 in U.S. Appl. No. 13/344,410.

* cited by examiner

SATELLITE SUBSET SELECTION

BACKGROUND OF THE INVENTION

The invention relates to an apparatus and a method for selecting a subset of satellites to use for locating a Global Navigation Satellite System (GNSS) receiver.

The Global Positioning System (GPS) is an example of a GNSS navigation system in which a receiver determines its position by precisely measuring the arrival time of signalling events received from multiple satellites. Each satellite transmits a navigation message containing the precise time when the message was transmitted and ephemeris information. Each sub-frame of the navigation message starts with a telemetry word (TLM) and the number of the sub-frame. The start of the sub-frame may be detected by means of a preamble sequence in the TLM. Each sub-frame also includes a handover word (HOW), which gives the exact time of the week (TOW) when the satellite will transmit the next sub-frame according to the local version of GPS time held by the satellite's clock. The ephemeris information includes details about the satellite's orbit and corrections for the satellite's own clock, in comparison with GPS time. The ephemeris and clock correction parameters may collectively be known as ephemeris information.

GPS signals are formed of a navigation message binary phase shift modulated (BPSK) onto a direct sequence spread spectrum signal. The spread spectrum signal comprises a unique pseudo-noise (PN) code that identifies the satellite. For civil application GPS signals transmitted using the L1 frequency, this code is known as the C/A code. The C/A code has a sequence length of 1023 chips and it is spread with a 1.023 MHz chipping rate. The code sequence therefore repeats every millisecond. The code sequence has an identified start instant when the two code generators in the satellite just transition to the all '1's' state. This instant is known as the code epoch. After various transport delays in the satellite, the code epoch is broadcast through the timing and sequence of specific code states assigned to the satellite. This signalling event can be recognised, in suitably adapted receivers, through a process of aligning a replica code with the code received from each satellite.

The navigation message has a data rate of 50 bits per second, lower than the code rate, and its data bit or symbol transitions are synchronised with the start of the C/A code sequence. Each bit of the navigation message lasts for 20 milliseconds and thus incorporates 20 repetitions of the C/A code. The navigation message is constructed from a 1500-bit frame consisting of five 300-bit sub-frames. Each sub-frame lasts for 6 seconds. The satellite transmits the navigation message and C/A code using a carrier frequency that is an integer multiple of 10.23 MHz (for the L1 carrier, the multiple is 154).

In addition to the time and ephemeris information, the data message also contains the satellite constellation almanac, parameters representing the ionospheric and tropospheric delay, health parameters and other information used by some receivers. There are 25 different frames of data broadcast from each satellite. Each frame contains identical information (apart from time) in sub-frames 1-3 inclusive but cycles through a pre-assigned sequence of data in sub-frames 4 and 5, which contain almanac and other information. The ephemeris information, including the satellite clock biases, is periodically refreshed by the GPS Control Segment, typically every 2 hours, so that the navigation data message is representative of the orbit and status of each satellite. There are indicators in the navigation message which provide the user with knowledge of when the ephemeris and clock data has been changed. Details of these changes are set out in the GPS interface standard, IS GPS 200.

As mentioned above, a GPS receiver may determine the time-of-arrival of a signalling event through a process of aligning a replica code with the code received from each satellite. The receiver may also use the TOW information contained in the navigation message to determine the time when the signalling event was transmitted. From this, the receiver can determine the transit time for the signalling event (from which it can determine the distance between it and the satellite), together with the position of the satellite at the time when the signalling event was transmitted (using the ephemeris information). The receiver can then calculate its own position. Theoretically, the position of the GPS receiver can be determined using signals from three satellites, providing the receiver has a precise time or knowledge of part of the positions, such as altitude. However, in practice GPS receivers use signals from four or more satellites to determine an accurate three-dimensional location solution because an offset between the receiver clock and GPS time introduces an additional unknown into the calculation.

If the satellite signal reception is poor (commonly known as weak signal conditions), or if the receiver only receives a short burst of the signal, the receiver may not be able to decode the TOW information. Without this information, the GPS receiver may be unable to determine the distance between it and the satellite with sufficient accuracy because the receiver will not know the time when the signalling event was transmitted. Under weak signal conditions or briefly glimpsed signals, the receiver may also be unable to recognise the start of a sub-frame since it may not be able to decode the TLM.

A receiver that has been unable to decode the TLM and TOW information in the navigation message may nonetheless be able to deduce some timing information even under weak signal conditions or from briefly-glimpsed signals. For example, the receiver may be able to determine a time shift between the satellite signal's spreading (PN) code and a locally generated version of the same, e.g. by correlating the received signal with a locally generated replica of the PN code or by using an equivalent signal processing technique. This time shift represents at least part of the transit time for the satellite signal. However, since both the PN code in the signal and the locally generated replica code are of finite length in space (known as the code wavelength), the correlation operation can only identify a part of the total time shift. This part of the total time shift represents a fractional part of the signal transit time between satellite and the receiver, measured in code repetition intervals. The integer number of code repetition intervals the signal took to travel between the satellite and the receiver cannot be measured by the receiver.

In order to compute its position accurately, the receiver also needs to be able to resolve discrepancies between the various clocks in the system. GPS time is defined by an ensemble of clocks generally located at the US Naval Observatory in Washington. Each satellite has its own operating clock (usually one of three on board the space vehicle), which is approximately synchronised with GPS time. In practice, however, the satellite clock is offset from GPS time by a small amount. The receiver clock is also likely to be offset from GPS time, at least prior to an initial location solution. Uncorrected, these clock biases introduce significant errors into the location calculation.

"GPS Receiver Structures for the Urban Canyon" by Peterson et al. presents a method for computing the position of a GPS receiver in a deep urban canyon, in which the receiver may obtain brief glimpses of satellites but rarely sees three or more satellites simultaneously. The method addresses the problem of having an unknown common system time by expanding the location calculation to encompass an additional satellite range measurement and an additional unknown parameter termed "coarse time". The Peterson paper thus proposes a solution in which signals from five satellites are required for a 3D-location solution.

"Fast Acquisition Techniques for GPS Receivers" by Lannelongue et al. also presents a method for computing the position of a GPS receiver in which the common system time is unknown.

The integer millisecond ambiguity is also addressed by U.S. Pat. No. 6,417,801, which describes a way of estimating the integer milliseconds by calculating the geometric pseudo-range of the receiver to the satellite. The geometric pseudo-range is calculated using an estimated position of the GPS receiver and the position of the satellite at an estimated GPS time. U.S. Pat. No. 6,417,801 estimates the number of integer milliseconds that the signal took to travel between the satellite and the GPS receiver from the estimated pseudo-range and adds this to a measured, sub-millisecond pseudo-range to obtain a 'full' pseudo-range. The full pseudo-ranges from five satellites are then used to calculate the location of the GPS receiver. This technique is also described in "A-GPS: Assisted GPS, GNSS and SBAS 72" by Frank Van Diggelen (see chapter 4).

Mathematical techniques may be used to change the unknowns output by the location calculation. For example, U.S. Pat. No. 7,064,709 explains that calculating the integer number of milliseconds using estimated pseudo-ranges is not always sufficiently accurate and instead proposes a method whereby a common transit delay, represented as an number of integer milliseconds, is inserted as one of the unknowns to be determined as part of the location calculation. U.S. Pat. No. 7,064,709 also proposes that differences may be used to create four equations and four unknowns from the five equations using satellite measurements.

U.S. Pat. No. 6,191,731 also describes making five range measurements to five satellites and solving the five resulting equations by weighting and subtracting one from the four others in order to eliminate one of the unknown terms. This is a purely mathematical procedure which, in this example, cancels the user clock error term from the five linearized position equations.

These techniques are similar to the differencing methods used in some land survey implementations in which GPS time is known. Signals from two different satellites are differenced at one receiver and that difference is then subtracted from a similar difference calculated at another receiver. This double-difference technique allows unknowns such as the satellite and receiver clock errors to be eliminated from the calculation. These techniques are generally operative only within a zone where the location solution converges with a low error.

Another method is the so-called 'Single-Difference' method in which one of the satellites is designated as a reference satellite. The estimated distances and transit times for the other four satellites are then compared with the equivalent values for the reference satellite. This has two advantages: first, it addresses the issue of integer ambiguity in the measured times-of-arrival; and second, it removes the receiver clock bias as an unknown at the instant of measurement, as the arrival of each signalling event is measured with reference to the arrival of the signalling event from the reference satellite. In this way, the receiver clock bias does not contaminate the measurements and does not enter into the location calculations. The receiver clock is used, however, to provide a timescale for measuring the time differences between the arrival times of the various signalling events.

The methods described above have in common the step of estimating the location of the receiver and the absolute time of transmission of the satellite signals prior to computing the location of the receiver. These initial estimates of receiver location and absolute time will usually incorporate some error, which the location algorithm needs to be able to tolerate if it is to converge on correct values for the receiver location and absolute time. Therefore, there is a need for an apparatus and method for conditioning the location calculation in such a way as to maximise a likelihood that the algorithm will converge on the correct receiver location.

SUMMARY OF THE INVENTION

According to a first embodiment of the invention, there is provided an apparatus for calculating the location of a receiver by means of a location algorithm that generates a receiver location in dependence on signalling events received by that receiver from a set of satellites, the apparatus being arranged to select, from a constellation of satellites visible to the receiver, the set of satellites to use in the location algorithm in dependence on an effect that it is estimated using that set of satellites will have on the capability of the location algorithm to generate an accurate location for the receiver.

The apparatus may be arranged to estimate the effect that using the set of satellites will have on the capability of the location algorithm to generate an accurate location for the receiver in dependence on a convergence zone associated with that set of satellites.

The location algorithm may generate the receiver location in dependence on an estimated location of the receiver, the apparatus being arranged to estimate the effect that the set of satellites will have on the capability of the location algorithm to generate an accurate location for the receiver in dependence on an error associated with the estimated location.

The location algorithm may generate the receiver location in dependence on an estimated transmission time of the signalling events, the apparatus being arranged to estimate the effect that the set of satellites will have on the capability of the location algorithm to generate an accurate location for the receiver in dependence on an error associated with the estimated transmission time.

The apparatus may be arranged to calculate the location of the receiver by performing two or more iterations of the location algorithm, the apparatus being arranged to select a first set of satellites to use in a first iteration of the algorithm and to select a second, different set of satellites for a subsequent iteration of the algorithm.

The apparatus may be arranged to, select the first set of satellites to comprise a first number of satellites and to select the second set of satellites to comprise a second number of satellites, said second number being higher than said first number.

The apparatus may be arranged to select the first set of satellites to be the set associated with the maximum convergence zone achievable by means of the constellation of visible satellites.

The apparatus may be arranged to select the first set of satellites to be associated with a larger convergence zone than the second set of satellites.

The apparatus may be arranged to select the second set of satellites to generate a more accurate location for the receiver than the first set of satellites.

The apparatus may be arranged to select the set of satellites by forming a candidate set comprising satellites that are visible to the receiver, repeatedly identifying which of the satellites in the candidate set is associated with the smallest convergence zone and eliminating that satellite from the candidate set until the candidate set consists of a predetermined number of satellites, and selecting the set of satellites to comprise the predetermined number of satellites in the candidate set.

The apparatus may be arranged to select the set of satellites by identifying one or more candidate sets of satellites that could be formed from the constellation of satellites visible to the receiver and used to calculate a location for the receiver, determining a convergence zone associated with each of the candidate sets, and selecting as the set of satellites the candidate set associated with the largest convergence zone.

The apparatus may be arranged to select the set of satellites to consist of a predetermined number of satellites in the set of visible satellites that have the highest levels of elevation relative to the receiver.

The apparatus may be arranged to select the set of satellites to consist of a predetermined number of satellites in the set of visible satellites that have the lowest line-of-sight velocities.

The apparatus may be arranged to designate one of the set of satellites as a reference satellite.

According to a second embodiment of the invention, there is provided a method for calculating the location of a receiver by means of a location algorithm that generates a receiver location in dependence on signalling events received by that receiver from a set of satellites, the method comprising selecting, from a constellation of satellites visible to the receiver, the set of satellites to use in the location algorithm in dependence on an effect that it is estimated using that set of satellites will have on the capability of the location algorithm to generate an accurate location for the receiver.

According to a third embodiment of the invention, there is provided a computer-readable medium encoded with instructions, that when executed by an apparatus for calculating the location of a receiver by means of a location algorithm that generates a receiver location in dependence on signalling events received by that receiver from a set of satellites causes the apparatus to select, from a constellation of satellites visible to the receiver, the set of satellites to use in the location algorithm in dependence on an effect that it is estimated using that set of satellites will have on the capability of the location algorithm to generate an accurate location for the receiver.

BRIEF DESCRIPTION OF THE DRAWINGS

For a better understanding of the present invention, reference is made by way of example to the following drawings, in which.

DETAILED DESCRIPTION OF THE INVENTION

Figure 1:
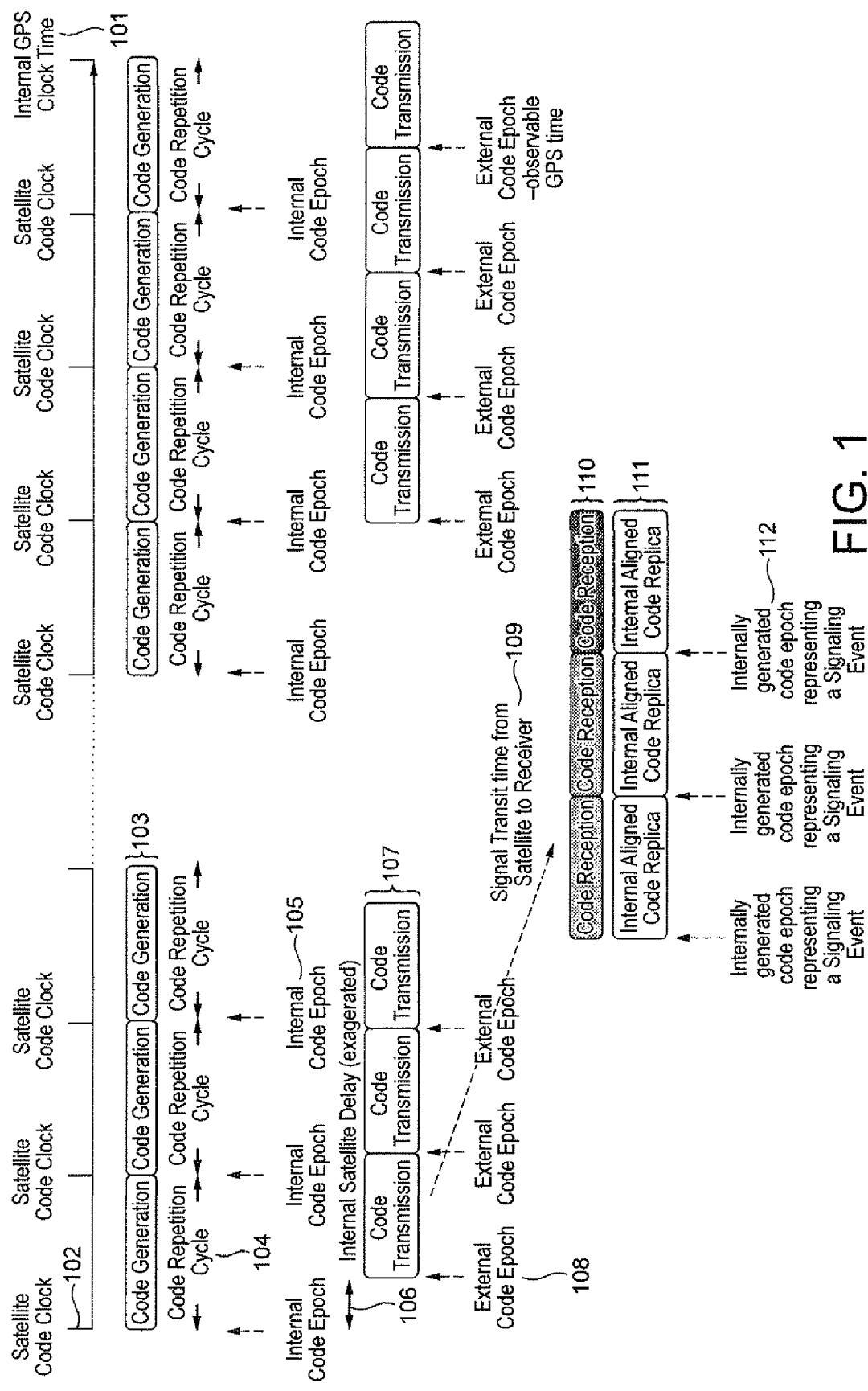
FIG. 1 illustrates an example of a signalling event.

An apparatus may be arranged to calculate the location of a receiver by means of a location algorithm that generates a receiver location in dependence on signalling events received from a set of satellites. The receiver may be able to receive signalling events from a plurality of satellites, representing the constellation of satellites that are visible to the receiver or a part thereof. The apparatus is preferably arranged to select only a subset of these satellites to use in calculating the location of the receiver. The apparatus preferably selects the satellites to use in dependence on an estimate of how using those satellites would affect the capability of the location algorithm to generate an accurate location for the receiver.

One or more embodiments of the invention may be implemented in a satellite navigation or GNSS system, such as GPS, Globalnaya Navigatsionnaya Sputnikovaya Sistema (GLONASS), Galileo, etc. Therefore, while one or more embodiments of the invention are described below specifically in reference to GPS systems, this is for the purpose of example only and it should be understood that the scope of the invention is not limited to GPS systems.

The apparatus may be configured to use one or more algorithms to monitor the veracity of a location and/or time solution. Straightforward examples include checking that the calculated values are close enough to initial estimates of the receiver's position and absolute time, and looking at one of the calculated parameters, such as receiver altitude, and checking that it appears reasonable. Other examples may require measurements from additional satellites. For example, checking that the residuals generated as part of the location calculation (described below) are not too large. These measurements may be obtained at substantially the same time as the other satellite ranging measurements or may be obtained at a second time later than the first. The additional measurements might also be obtained from other location sensitive inputs such as an altimeter or inertial navigation system or dead-reckoning calculation or from an external source. Such additional measurements, from satellites or other means, may provide a means of checking the accuracy of the location calculation.

In a simplified method, for example, the initial location solution is determined using a minimum number of measurements. The solution so determined is then used to compute a value for the additional measurement (a range to another satellite, for example). If there are substantial differences between the computed and measured range, this is a clear indication, or metric, that the initial location solution is in error.

The apparatus is preferably arranged to determine the location of the receiver in dependence on measured indications of the transit times of signalling events transmitted by the selected satellites. The apparatus may also determine the location of the receiver in dependence on estimated distances between the receiver and each of the selected satellites.

The receiver may not be capable of completely decoding the signals received from the satellites in the visible constellation. This may be due to weak signal conditions or because the receiver only obtains brief glimpses of the satellites. The apparatus is therefore preferably arranged to use an a priori estimate of receiver location and an a priori estimate of the absolute time of transmission of the signalling events from the satellites to calculate the location of the receiver. These a priori estimates may be used by the apparatus to estimate the distance between the receiver and each of the selected satellites.

The location algorithm is suitably capable of converging on an accurate estimate for receiver location and absolute time, despite errors that may be present in the a priori estimates that form the basis of the calculation. The limits of the errors in estimated position and time that the algorithm is able to tolerate, whilst still providing a correct solution for position and time, may be termed the "convergence zone". The convergence zone is typically projected upon the receiver position and time domain. The apparatus is preferably arranged to estimate the effect that using a particular set of satellites will have on the capability of the location algorithm to generate an accurate location for the receiver in dependence on a convergence zone associated with that set of satellites.

The location algorithm may require measurements from a minimum number of satellites to determine the position of the receiver. Typically, for situations in which the receiver has not been able to decode absolute time from the satellite signals, that minimum number of satellites is five. However, if an additional constraint is placed upon the algorithm (e.g. by fixing the receiver's height), then the location algorithm might require fewer than five satellites. Similarly more than five satellites may also be used. The subset of satellites chosen to compute the location of the receiver preferably comprises at least the minimum number of satellites, or equivalent measurements, needed to calculate the receiver's location in a given scenario.

The a priori estimates of receiver position may be based on e.g. a previously calculated position of the receiver or on an estimate of position received from another source, such as a cellular network, on manual input from a user or on data received via a data input port on the user equipment. The receiver position may also be derived from one or more previously calculated values of receiver position, e.g. by using a linearly regressive prediction filter or similar. The estimate of absolute time may similarly be based on a previously calculated value that has been updated with the time that has elapsed since, or a version of absolute time obtained from a different source from the satellite (e.g. from a cellular network), on the receiver clock, or on information received via manual input or a data port. The calculation may also use ephemeris information so that the estimated position of the satellite at the estimated absolute time can be determined. The ephemeris information may have been stored from a previous location calculation or may be obtained from a source other than the satellite (e.g. from a cellular network), or could be obtained directly from each satellite as required, either in a continuous data stream or as disjoint segments of the broadcast ephemeris information.

The apparatus preferably has a priori knowledge of the maximum errors likely to be present in the initial estimates of receiver position and absolute time. The maximum expected errors may be known from the source of the original estimates. For example, the original position estimate may have been selected to be the centre of a cell in a cellular network within which the GNSS receiver is known to be located. The maximum error in the original estimate of receiver position may then be determined from the size of that cell. Similarly, the original time estimate may have been obtained from a cellular base station's copy of an absolute time. Some networks, e.g. CDMA, require each base station to be synchronised to GPS time within a maximum acceptable error. In such a scenario, the maximum error in the estimate of absolute time will be known. The a priori knowledge of the maximum errors may be exploited, together with knowledge of the acceptable limits that are placed on initial errors by the convergence zone for the location algorithm, to determine the most appropriate satellites to use in the location calculation.

An example of an event is the occurrence of a 1 ms time transition or a code epoch or a data symbol or bit transition, or similar on the satellite. The event results in the almost immediate transmission of a signalling event by the satellite. There are many such signalling events known to those skilled in the art. The regular repetition of an event is normal in navigation satellite systems. The signalling event may therefore be repetitive, e.g. the start of the C/A code in GPS systems, which repeats at one millisecond intervals. A repetitive signalling event can be considered to travel through space separated from neighbouring events by a wavelength in distance, analogous to the wavelength of a carrier signal. This wavelength is denoted as $\lambda_c$, and may be referred to as the code wavelength in the case that the events are separated in space by repetitions of a code sequence.

An example of a repetitive signalling event is illustrated in FIG. 1. This figure illustrates a code repetition cycle in a GPS satellite. Each satellite clock is free-running, but is continually steered towards a common absolute time reference (GPS time). The actual time of occurrence of an event is therefore determined on each satellite individually. In FIG. 1, the code repetition cycle is determined by GPS clock 101, internal to the satellite. Each 1 ms time transition 102 in the internal GPS clock triggers an event, causing the satellite to generate C/A code 103. The generated code incorporates a number of code repetition cycles 104, which each commence at internal code epoch 105 coinciding with the 1 ms time transitions in the internal GPS clock. The generated code is subject to a small delay 106 within the satellite before being transmitted (107). The small internal delay between code generation and code transmission results in a small offset between internal code epochs 105 and external code epochs 108. The external code epochs are spaced at 1 ms intervals and thus can be considered to represent an externally-observable version of the satellite GPS clock. The code is then subject to a further delay due to the transit time of the signal 109. The GPS receiver may then align an internal code replica 111 with the received code 110 to generate the internal code epochs 111 from which the time-of-arrival of the signalling events represented by those code epochs can be determined.

The absolute time associated with a signalling event is the time, according to an absolute time reference (such as GPS time), when that signalling event is transmitted by the satellite (e.g. the absolute time corresponding to the transmission of external code epoch 108). This is not necessarily the same as the time when the transmission occurred according to the satellite's own clock, since that clock is offset from absolute time by a satellite clock bias.

The various embodiments described herein involve values represented in units of both distance and time. These values often relate to the transit of GNSS signals, which have a known speed (the speed of light), and so can generally be readily converted from values expressed in terms of distance into values expressed in terms of time and vice versa. The equations given below are generally expressed in terms of time as this is the basis upon which the satellite signal receiver makes its measurements of the arrival of signalling events. However, equivalent distance quantities may be derived through multiplication by the speed of light. The equations below can therefore readily be converted between being expressed in terms of distance and being expressed in terms of time and are not intended to be limited in scope to the particular form in which they are expressed below.

The apparatus for calculating the position of the receiver may include a GNSS receiver or may be located in the same piece of equipment as the receiver (from which the measured components of the transit time can be obtained). Alternatively, the apparatus may be separate from the receiver. For example, the apparatus may be a server. In this scenario the receiver suitably sends the times-of-arrival to the apparatus over a communication link. The apparatus may similarly return to the receiver the result of the location calculation. The communication link may take one of several forms commonly known in the art, such as wireless communication, packet communication, pager system, internet or other wired form of communication link.

Location Algorithm

It has been explained above that under some circumstances it may not be possible for a receiver to decode a satellite navigation signal sufficiently to obtain the time of transmission of the signal. In such situations, the receiver is no longer able to determine how long a signalling event took to travel between the satellite and the receiver directly from the signal. Instead, the apparatus arranged to calculate the location of the receiver may first obtain estimates of receiver location and time of transmission, and update these estimates based on limited timing information the receiver is able to derive from the received signal. Various location algorithms operable to compute a receiver location under such circumstances are briefly described above. One such location algorithm, the "single-difference" method, is described in more detail below for the purposes of example. The methods and apparatus for selecting a set of satellites on which to base a location calculation can, however, be equally applied to other location algorithms.

Figure 2:
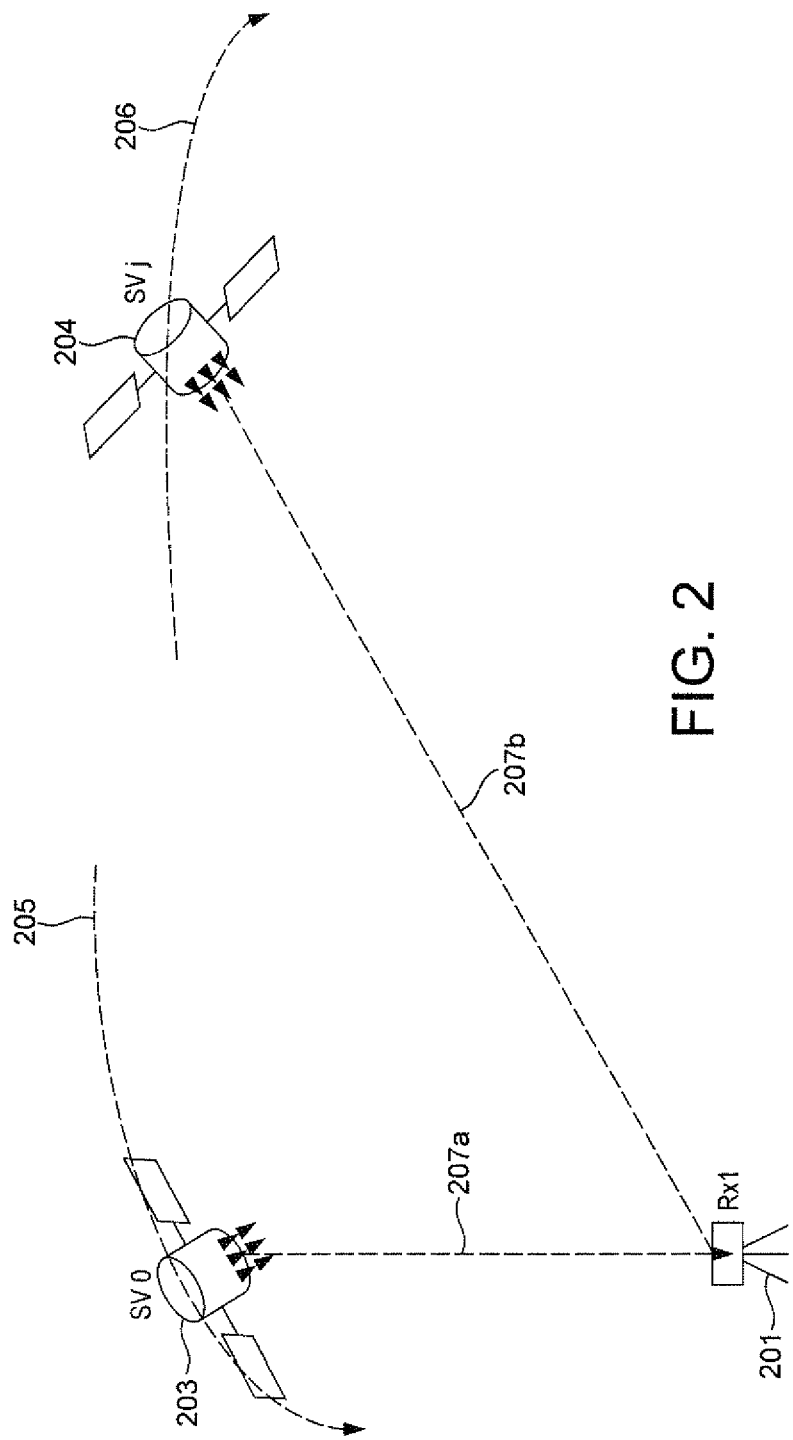
FIG. 2 illustrates an example of a satellite constellation.

FIG. 2 shows a GPS receiver 201 receiving GPS signals 207a and 207b from two GPS satellites, 203 and 204. Each satellite is travelling according to a respective orbit (205 and 206). The GPS receiver may designate one of these satellites as a reference satellite. This satellite sets the time base against which all other signals are measured.

First consider the case of a signal received from single satellite 204. The time-of-arrival of signalling event 207b at GPS receiver 201 can be expressed as:

$$t_{rx,j} = t_{sat,j} + \frac{D_j(t_{sat,j})}{c} + \frac{(B_U - B_{SV,j})}{c} + \frac{(d_{iono,j} + d_{tropo,j})}{c} + \varepsilon_j \quad (1)$$

where:

$t_{rx,j}$ is the arrival time of the signalling event transmitted by satellite j at the receiver (which in this instance is the full time-of-arrival rather than just the fractional part measured by the receiver; ambiguity in the measured time-of-arrival and how it may be resolved are discussed later);

$t_{sat,j}$ is the absolute time when the signalling event was transmitted by the $j^{th}$ satellite;

$D_j(t_{sat,j})$ is the distance between the receiver and satellite j at the time when the signalling event was transmitted;

$B_U$ is the receiver clock bias, expressed in terms of distance;

$B_{SV,j}$ is the clock bias of satellite j, expressed in terms of distance;

$d_{iono,j}$ and $d_{tropo,j}$ are the excess delays due to signal transition through the ionosphere and troposphere, over those in free space;

$\varepsilon_j$ is the measurement error, which is mainly due to noise and multipath errors; and c is the speed of light in meters per second.

Equation (1) can be extended by comparing signalling event 207b received from satellite 204 with signalling event 207a from reference satellite 203. Rather than consider each time-of-arrival independently, the receiver may measure only the difference between the arrival times. This eliminates the receiver clock bias, which is identical for both. The receiver clock bias is the difference between the time held in the receiver clock to an absolute or reference time, such as GPS time. If it is assumed that the transmitted events occurred at the same absolute time (as measured by each satellite), this gives the following equation:

$$t_{rx,j} - t_{rx,0} = \frac{D_j(t) - D_0(t)}{c} + \frac{(B_{SV,0} - B_{SV,j})}{c} + \frac{(d_{iono,j} - d_{iono,o} + d_{tropo,j} - d_{tropo,o})}{c} + (\varepsilon_i - \varepsilon_0) \quad (2)$$

Where the reference satellite is designated by the subscript '0' and t designates the absolute time corresponding to the signalling event transmitted by each satellite.

A problem with solving equation (2) is that under weak signal conditions the receiver may be unable to distinguish the arrival of repetitive events from each other, for example, by using the data modulation to condition the received code epochs. For example, a GPS receiver may be able to detect the start of each code epoch, even under weak signal conditions, but those code epochs repeat at 1 ms intervals. Without being able to decode more of the signal, therefore, the receiver is unable to directly identify which of the repetitive signalling events received from the $j^{th}$ satellite and the reference satellite were transmitted at the same GPS time (as measured by each satellite). It is therefore unclear which times-of-arrival should be compared with each other in calculating $t_{rx,j}-t_{rx,O}$.

One option is to predict a likely time-of-arrival for a signalling event transmitted by the $j^{th}$ satellite using the time-of-arrival of the corresponding signalling event from the reference satellite, estimated distances between the receiver and each of the satellites and the differences in the clock biases between the satellites.

The distance between the $j^{th}$ satellite and the receiver may be defined as the Euclidean norm of the difference in vector positions, $(x_{sSVj}-x)$, where $x_{SVj}$ is the position vector of the $j^{th}$ satellite and x is the position vector of the receiver. The estimated distance between the $j^{th}$ satellite and the receiver may be defined as the Euclidean norm of the difference in vector positions, $(x_{SVj}(t_e)-x_e)$, where $x_{SVj}(t_e)$ is the position vector that corresponds to the location of the $j^{th}$ satellite at an initial estimate of absolute time $t_e$ and $x_e$ is the position vector corresponding to an initial estimate of the location of the receiver. This gives rise to the following equations:

$$D_j(t) = \sqrt{(x_{SV,j}(t) - x)^2 + (y_{SV,j}(t) - y)^2 + (z_{SV,j}(t) - z)^2} \quad (3)$$

$$\hat{D}_j(t_e) = \sqrt{(x_{SV,j}(t_e) - x_0)^2 + (y_{SV,j}(t_e) - y_0)^2 + (z_{SV,j}(t_e) - z_0)^2}$$

Once a time-of-arrival for the signal has been predicted, the actual time-of-arrival of a signalling event from the $j^{th}$ satellite that is closest to that predicted time may be selected as the actual time-of-arrival. Subtracting the predicted time-of-arrival from the actual time-of-arrival gives a single difference residual. The single-difference residual may be defined as follows:

$$\nabla r_{rx,j0} = \nabla R_{rx,j0} - (\hat{D}_j(x_e, t_e) - \hat{D}_0(x_e, t_e)) + \nabla B_{j0} \quad (4)$$

where:

$\nabla r_{rx,j0}$ is the single difference range residual, the error arising from errors in the original estimates of absolute time and receiver position;

$\nabla R_{rx,j0}$ is the difference in range between the reference satellite and satellite j as indicated by the times-of-arrival of the signals from those satellites;

$\hat{D}_j(x_e,t_e)$ is the estimated distance between the estimated receiver location $x_e$ and the reference satellite at the estimated absolute time, $t^e$;

$D_0(x_e,t_e)$ is the estimated distance between the estimated receiver location $x_e$ and satellite j at the estimated absolute time, $t_e$; and $\nabla B_{j0}$ the difference in the clock biases of the reference satellite and satellite j expressed in terms of distance.

The expression for $\hat{D}_j(x_e,t_e)$ can be substituted into equation (4) to give an expression for the single difference residual in terms of the initial estimates of receiver position and absolute time. Using a Taylor Series approximation, limited to the first two terms, equation (4) can be rewritten as:

$$\begin{vmatrix} \nabla r_{10} \\ \nabla r_{20} \\ \vdots \\ \vdots \\ \nabla r_{n0} \end{vmatrix} = \begin{vmatrix} -\nabla \cos(\alpha_{x1}^0) & -\nabla \cos(\alpha_{y1}^0) & -\nabla \cos(\alpha_{z1}^0) & (\dot{p}_1 - \dot{p}_0) \\ -\nabla \cos(\alpha_{x2}^0) & -\nabla \cos(\alpha_{y2}^0) & -\nabla \cos(\alpha_{z2}^0) & (\dot{p}_2 - \dot{p}_0) \\ \vdots & & \vdots & \\ \vdots & & \vdots & \\ -\nabla \cos(\alpha_{xn}^0) & -\nabla \cos(\alpha_{yn}^0) & -\nabla \cos(\alpha_{z2}^0) & (\dot{p}_n - \dot{p}_0) \end{vmatrix} \cdot \begin{vmatrix} \Delta x \\ \Delta y \\ \Delta z \\ \Delta t \end{vmatrix} \quad (5)$$

Or, more compactly in matrix form, as:

$$\nabla r = \nabla H \cdot \Delta x$$

where $\nabla r_{j0}$ are the single difference residuals for the $j^{th}$ satellite and the reference satellite, expressed in terms of distance;

$\nabla \cos(\alpha_{xj}^0)$, $\nabla \cos(\alpha y j^0)$ and $\nabla \cos(\alpha phd\, zj^0)$ are the differences in the direction cosines for the $j^{th}$ satellite and the reference satellite;

$\nabla H$ is defined as the single difference observation matrix, which can be derived from the observation or geometry matrix;

$\dot{p}_j$ is the velocity of the $j^{th}$ satellite resolved along the line-of-sight between the receiver and the $j^{th}$ satellite; and $\Delta x, \Delta y, \Delta z$ and $\Delta t$ are the errors in the originally estimated user position and GPS time.

The equations can be exactly solved with a minimum of four single difference measurements (using five satellites). There is a unique solution which provides corrections to (x, t):

$$\Delta x = \nabla H^{-1} \cdot \nabla r \quad (6)$$

The algorithm above was described on the basis that all signalling events were transmitted at the same absolute time (according to the satellites' clocks). A similar algorithm selects signalling events that were transmitted at different absolute times according to the satellites' clocks. The algorithm is essentially the same as that described above, except that the predicted time-of-arrival for the $j^{th}$ satellite additionally incorporates compensation for the difference in transmission times between the signalling events transmitted by the reference satellite and the $j^{th}$ satellite.

An example of how the single-difference method described above might be implemented in practice is described below. In this example, the location system is a GPS system and the receiver is only capable of decoding the C/A code in the received satellite signals. The signalling events detected by the receiver are thus code epochs, the time between repetitive signalling events is 1 ms and the receiver is able to determine times-of-arrival of the signalling events that are sub-one-millisecond. This is for the purposes of example only, as the algorithm described below is equally applicable to other satellite navigation systems and to scenarios in which the receiver is able to measure a greater or lesser portion of the transit e of the signalling event.

This example of the single-difference algorithm may be explained by first splitting the full time-of-arrival of equation (1) into its integer and fractional components on the left hand side, and using $t_{gps}$ as the time of that the signalling event was transmitted from the satellite:

$$\tau_j + N_j = t_{gps} + \frac{D_j(t_{gps})}{c} + \frac{(B_U - B_{SV,j})}{c} + \frac{(d_{iono,j} + d_{tropo,j})}{c} + \varepsilon_j \quad (7)$$

$\tau_j$ is the fractional, measured part of the time-of-arrival (sub-one-millisecond) and $N_j$ is the unobserved integer part of the time-of-arrival (an unknown integer number of milliseconds, more generally representing an unknown integer number of code repetition intervals).

Once again, the reference satellite can be used to set a time base against which all other satellites are compared. Taking the difference between equation 7 and a reference satellite yields the following equation, noting that the tilde over the $\tau$ terms signifies that these signalling event arrival times are corrected for the satellite clock bias:

$$\tilde{\tau}_j = \tau_j + \frac{B_{SV,j}}{c} \quad (8)$$

$$(\tilde{\tau}_j - \hat{D}_j(x_e, t_e)/c) - (\tilde{\tau}_0 - \hat{D}_0(x_e, t_e)/c) = -(N_j - N_0) + (\tilde{\varepsilon}_j - \tilde{\varepsilon}_0)$$

The residual ionospheric and tropospheric errors have been subsumed into the error terms, $\varepsilon$, in equation 8. All of the terms on the left-hand side of equation (8) are known or can be estimated. The right-hand side of equation (8) is close to an integer millisecond since the errors are small. A modulo operation can be performed on both sides of equation (8) to remove the integer millisecond component as an unknown:

$$|(\tilde{\tau}-\hat{D}_j(t_e)/c)-(\tilde{\tau}_0-\hat{D}_0(t_e)/c)|_{mod\,1ms}=(\tilde{\varepsilon}_j-\tilde{\varepsilon}_0) \quad (9)$$

Equations 7 through 9 inclusive can be converted from time to distance through multiplication throughout by the speed of light, c. The term $c \cdot \tau_j$ represents the sub-code wavelength part of the distance between the receiver and the $j^{th}$ satellite.

When equation (9) is evaluated with estimated distances, rather than the true distances, correct elimination of the integer term is achieved when (excepting a small region of error due to the effects of noise and multipath represented by $c \cdot (\varepsilon_j - \varepsilon_0)$):

$$|(D_1 - \hat{D}_j(x_e,t_e)) - (D_0 - \hat{D}_0(x_e,t_e))| < 0.5 \lambda_c \quad (10)$$

Equation 10 represents a re-organisation of equations 7 and 8 through the replacement of the signalling event transit time by the satellite to receiver distance, $D_j$, $D_0$. In addition, $x_e$ and $t_e$ are the initial estimates of user position and GPS time respectively and $\lambda_c$ is the distance between repetitive signalling events, which is approximately 300 km for GPS C/A code epochs.

The updates to the initial estimates of receiver location and absolute time may once again be computed by means of equation (6). In this version of the algorithm, the vector $\nabla r$ can be formed by first constructing a vector $\Delta t$. The vector $\Delta t$, in units of milliseconds, can be constructed as follows:

$$\Delta t_j = 1000 \times [\tilde{\tau}_j - \hat{D}_j/c) - (\tilde{\tau}_0 - \hat{D}_0/c)] \quad (11)$$

Assuming that the satellites are GPS satellites, and the signalling events identified by the receiver will be the starting instant of a 1 ms C/A code, $\tau_j$ are the measured, sub-ms portions of the times-of-arrival after correction for the satellite clock biases. The integer part of equation (11) may be removed by performing a modulo 1 ms operation and the result converted into meters.

$$\Delta t_j = \mod(\Delta t_j, 1) \quad (12)$$
$$\text{if } (\Delta t_j > 0.5) \Delta t_j = \Delta t_j - 1$$
$$\Delta r_j = \frac{c}{1000} \Delta t_j$$

Once the vector $\Delta r_j$ has been constructed, equation (6) can be solved to compute the position and time updates.

For both algorithms described above, equation (6) may be straightforwardly solved using standard techniques.

As another example, equation (13) may be used to solve for over-determined least squares systems:

$$\Delta x = (\nabla H^T \cdot \nabla H)^{-1} \cdot \nabla H^T \cdot \nabla r \quad (13)$$

in which the vector, $\nabla r$, is orthogonally projected onto a linear manifold spanned by the columns of the matrix, $\nabla H$.

The ability of the location algorithms described above to converge on the correct location of the receiver may be dependent on which satellites are selected upon which to base the calculation. For example, the single-difference method described above is only guaranteed to converge if the difference between the error in the estimated range for all non-reference satellites and the error in the estimated range for the reference satellite is less than $0.5\lambda_c$ (see equation (10) above). It is therefore beneficial to try and select the subset of satellites to be used in the location calculation so that these errors do not become too large.

The estimated ranges utilised in the single-difference method are based on estimates of receiver position and absolute time. These estimates incorporate an error, and these errors provide various mechanisms that the apparatus arranged to calculate the position of the receiver might use to optimise its satellite selection. These various mechanisms are described in more detail below, but first the concept of a convergence zone is described in more detail.

Convergence Zone

As mentioned above, the convergence zone may be defined by the limits of the errors in estimated position and time that the algorithm is able to tolerate, whilst still providing a correct solution for position and time. The measurement and modeling errors that the algorithm is capable of tolerating can be partitioned between errors in absolute time (primarily causing satellite location errors) and errors in the estimate of receiver location (normally expected to be along or in the receiver's local tangent plane to the Earth). As an example, the practical implementation of the single-difference method described above will tend to converge if receiver location is known to within 100 km and GPS time is known, or if GPS time is known to within 120 seconds when receiver position is known. Of course, in many instances, neither receiver location nor absolute time is known and both have to be estimated. In such situations, the errors in the location and time estimates both contribute to an error in the estimated ranges between the receiver and the satellite on which the location calculation will be based, as illustrated in FIG. 3.

Figure 3:
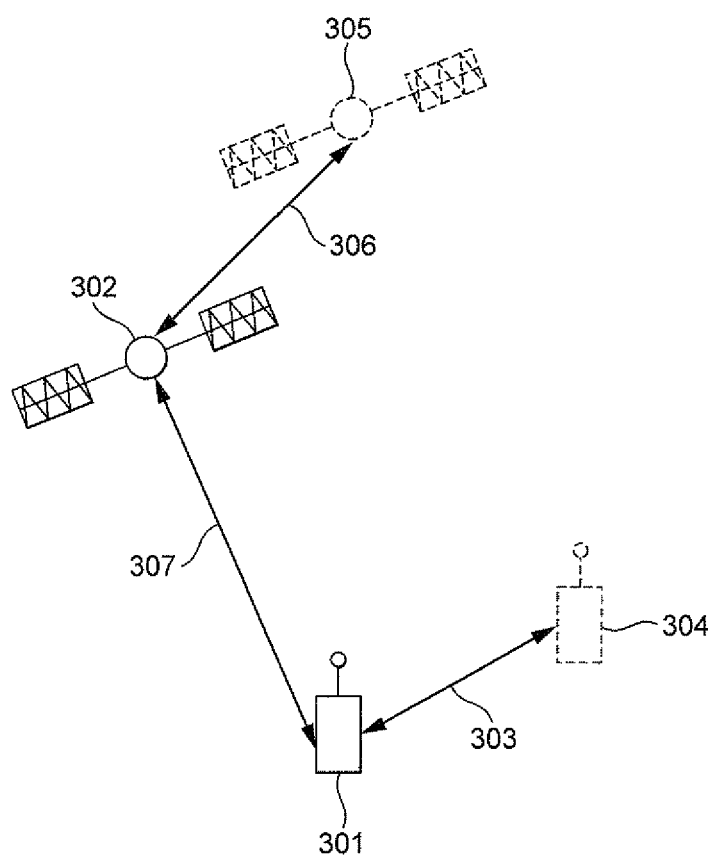
FIG. 3 illustrates an example of errors in initial estimates of position.

FIG. 3 illustrates an estimated location of a receiver 301 and an estimated location of a satellite 302 at the instant of transmitting a signalling event. The location of the receiver has suitably been determined based on an estimated time of transmission of the signalling event and the ephemeris information. The difference between these estimated locations gives an estimated range 307 between the receiver and the satellite. The a priori errors of receiver location and time of transmission of the signalling event are, however, likely to be different from the actual receiver location and time of transmission. This has the result that the actual location of the receiver 304 differs from the estimated location by position error 303. The error in the time of transmission causes the satellite to be located at the incorrect point in its orbit, resulting in the actual location of the satellite 305 differing from the actual location by position error 306. Both position errors 303 and 306 result in an error being incorporated into estimated range 307 that forms the basis of the location calculation.

Measurements are made along the line-of-sight to the satellite. The total resolved error along the line-of-sight between the receiver and the satellite can be expressed as:

$$\varepsilon_{LOS,j} = \dot{p}_j t_s + |p_{RX}| \cos(\phi_j) \leq \frac{\lambda_c}{2} \quad (14)$$

where $\dot{p}_j$ is the line-of-sight velocity of the satellite, $t_s$ is the error in the estimate of absolute time, $|p_{RX}|$ is the absolute value of the receiver location error vector and $\phi_j$ is the angle between the receiver location error vector and the line-of-sight to the satellite.

Within the convergence zone, the overall error is less than or equal to $\lambda_c/2$, so that a correct solution of receiver position and absolute time is computed by the algorithm. Thus for a maximum permitted value of $t_s$, the allowable receiver position error depends upon the angle $\phi_j$.

Figure 4:
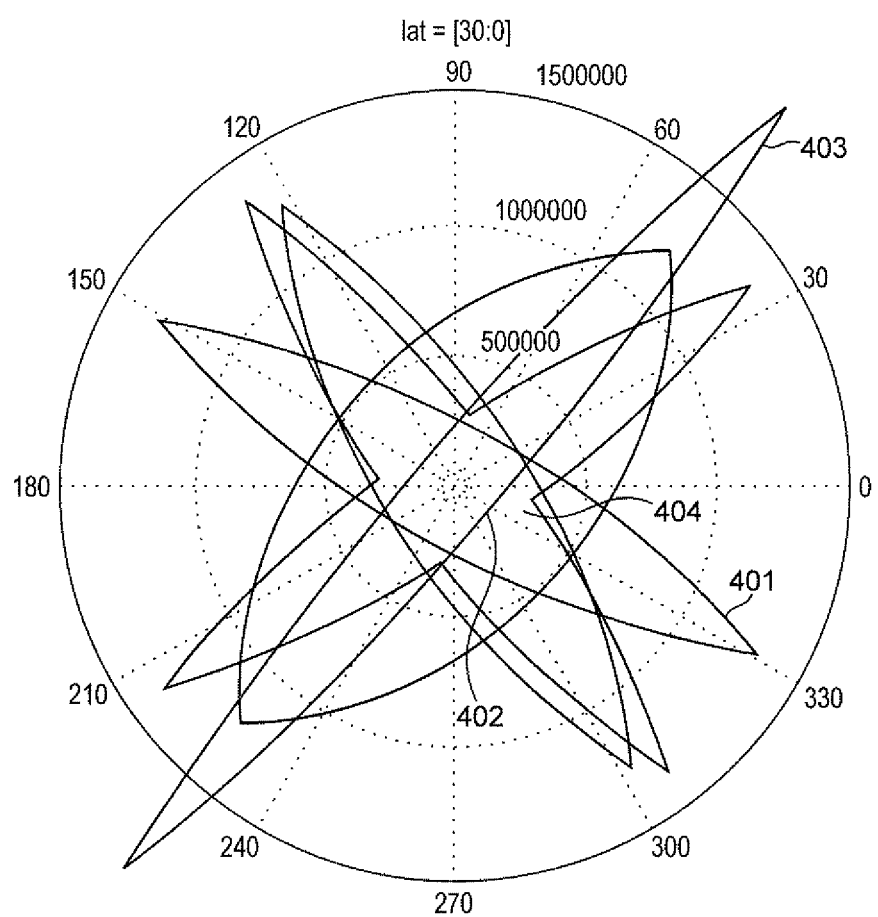
FIG. 4 illustrates examples of convergence zones.

For each satellite, the locus of points on the surface of the Earth for which the inequality of equation (14) holds as an equality (and allowing for both positive and negative errors) draws out a curve similar to an ellipse with the semi-minor axis aligned with the LOS to the satellite. These curves are thus not aligned with each other but to the direction of each satellite. Examples of such curves are illustrated in FIG. 4 (see e.g. curve 401).

The size of the maximum convergence zone is determined by the minimum area, bounded by the ±values of the maximum resolved lateral error due to each satellite, which is inscribed on the receiver's local tangent plane (see equation (15)). Referring to FIG. 4, the maximum convergence zone is the smallest area 402 inscribed by the satellite curves.

The maximum value of the semi-minor axis of one of these curves may be given by:

$$p_{RX,min} \leq \frac{\left(\frac{\lambda_c}{2} - |\dot{p}_j| t_{s,max}\right)}{\cos \beta_j} \quad (15)$$

where $\beta_j$ is the angle of elevation for satellite j, from the receiver position.

Examples of how equation (15) might be used to help select an optimum set of satellites to use in calculating the location of a receiver are described below.

Satellite Subset Selection

An apparatus might be arranged to use various different mechanisms to determine an optimum subset of satellites. Examples of these mechanisms, and the scenarios in which they might be appropriate, are described below.

Satellite Set Selected in Dependence on Iteration

The apparatus is suitably arranged to perform two or more iterations of the location algorithm, i.e. to compute solutions from the algorithm multiple times, even though no new measurements are available or processed. The apparatus may also be suitably arranged to select a different set of satellites on which to base the location calculation for one iteration of the algorithm from those selected for another iteration of the algorithm. In particular, the satellite subsets may comprise different numbers of satellites for different iterations. Specifically, satellite subsets may be selected according to different criteria for different iterations. For example, a satellite subset might be selected to maximise the size of the convergence zone for one iteration, for example, a first iteration, and to maximise the precision of the solution for another (later) iteration.

In a preferred embodiment, the apparatus is arranged to use a set of satellites comprising the minimum number of satellites required by the algorithm for the first iteration of the single difference computation. The subset for the first iteration may be chosen to maximise the convergence zone.

The apparatus may be arranged to use a set of satellites comprising more than the minimum number of satellites for later iterations when the size of the convergence zone is less critical. This is because the location calculation of later iterations is based on the estimated receiver location and absolute time values generated by the previous iteration, which should incorporate a lower error than the a priori estimates of receiver location and absolute time. The set of satellites for later iterations may therefore be selected to increase the likely accuracy of the results generated by the algorithm at the expense of the size of the convergence zone, e.g. by selecting a set of satellites having a reduced value for the Dilution of Precision compared with the set of satellites chosen for the first iteration, or by selecting all the satellites for which measurements are available. This procedure does not require any new measurements, but simply uses a selection of the measurements to improve the region of convergence at the first step in the iteration.

Figure 5:
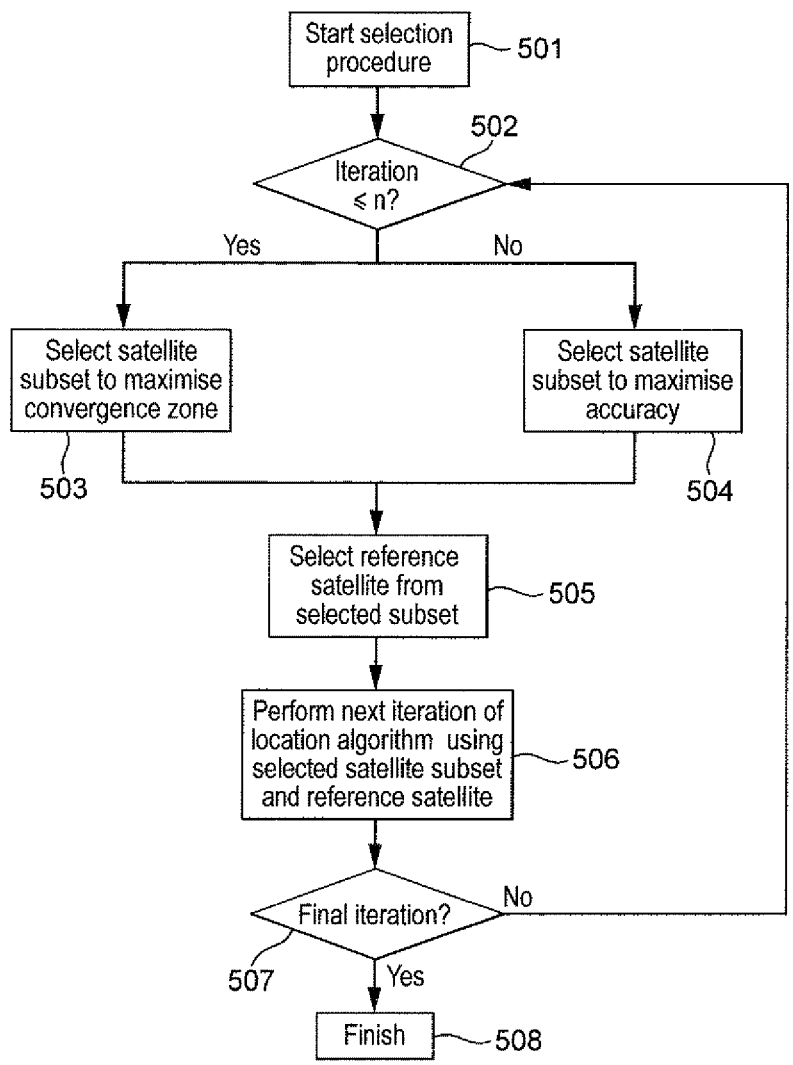
FIG. 5 illustrates the steps of a method for selecting a satellite subset according to iteration.

An example of such a process is shown in FIG. 5. The process begins in step 501. In step 502, the apparatus determines whether the current iteration is less than or equal to a predetermined number n, after which the apparatus will change the criteria on which it bases its selection of the satellites. Typically, n=1, as described in the example above. If the number of the iteration is less than or equal to the predetermined number, the apparatus selects the satellites so as to maximise the convergence zone (step 503). If, however, the number of the iteration is greater than the predetermined number, the apparatus may select the satellites so as to maximise the likely accuracy of the resulting solution (step 504). In this example, the location algorithm is one that involves the designation of one of the selected satellites as a reference satellite, and so in step 505 the apparatus selects the reference satellite. The next iteration of the location algorithm is then performed using the selected satellites (step 506). In step 507, the apparatus checks whether this is the final iteration. If not, the process returns to step 502. If the final iteration has been reached, the process terminates in step 508.

FIG. 5 shows satellites being selected for each iteration. In some instances, the satellites that would be selected under one particular criterion will be the same for successive iterations so there is no need to redo the calculations on which the selection is based. For example, the set of the visible satellites that will give the largest convergence zone may remain unchanged from one iteration to the next so that there is no need to perform the selection procedure after the initial determination.

In a specific example, the subset used for the first iteration may comprise five satellites. After an initial location and absolute time offset is determined, a second location determination may be executed using the complete satellite constellation or a larger subset (for example, 6 or more). The subsequent iteration calculations may be seeded with the revised estimates of either location or absolute time, or with both the revised estimates of location and absolute time.

Source of Errors

The exact method used to select the satellite subset may be chosen in dependence on the a priori errors associated with the original estimates of receiver position and absolute time. In particular, the method might be selected in dependence on a relative division in the overall error between receiver location and absolute time.

Figure 6:
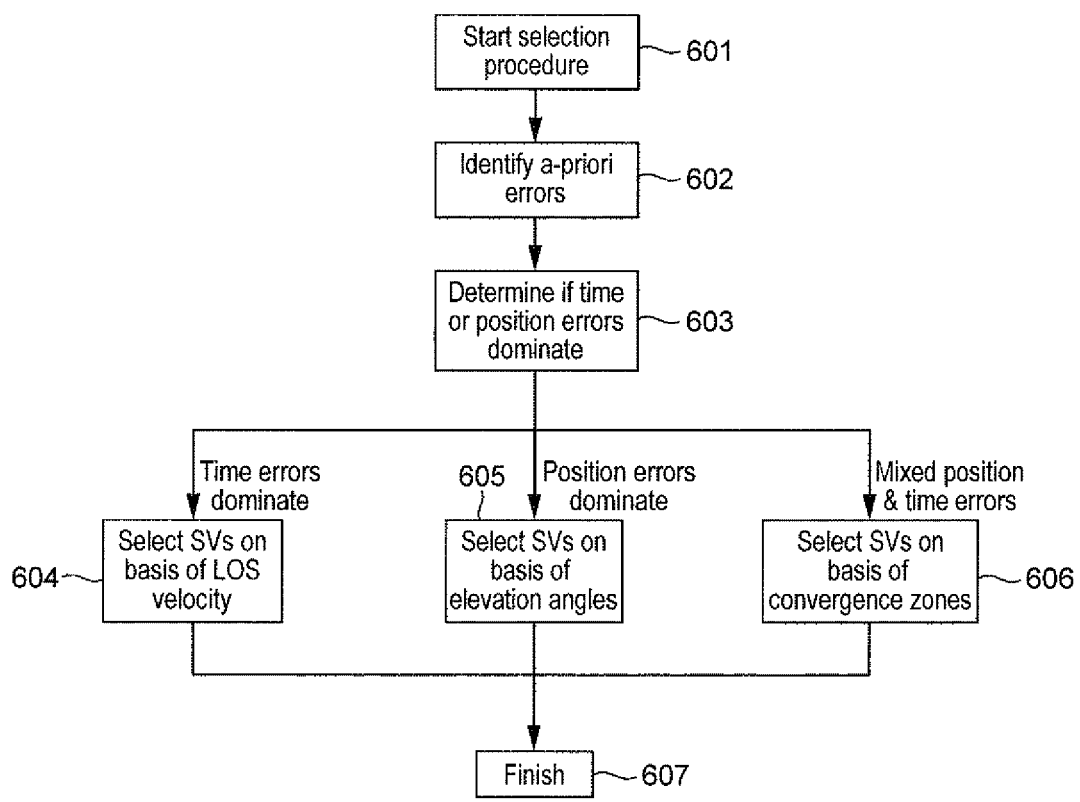
FIG. 6 illustrates the steps of a method for selecting a satellite subset according to error source.

Some specific methods for selecting the satellites to use in the location algorithm are described in detail below. However, FIG. 6 illustrates an example of how the satellites might be selected in dependence on where the majority of the error lies. The procedure commences in step 601. In step 602, the a priori errors are identified. In step 603 it is determined whether the error in one or other of the a priori estimates dominates. One of the estimates may be considered to dominate the error if, for example, either position or time account for 80% or higher of the total a priori error. If time errors dominate, then the satellites may be selected in dependence on the line-of-sight velocities of the visible satellites (step 604). If position errors dominate, then the satellites may be selected in dependence on the elevation angles of the visible satellites (step 605). If neither estimate dominates the errors, then the satellites may be selected in dependence on convergence zones associated with the visible satellites (step 606). The procedure terminates in step 607.

Selecting Set of Satellites in Dependence on Line-of-Sight Velocities

An error in the estimate of absolute time impacts the estimated range between the receiver and the satellite by placing the satellite in the wrong position in the sky. The size of the error in the resulting range estimate is dependent both on the error in the estimate of absolute time and the line-of-sight velocity of the satellite. Therefore, if the uncertainty in the a priori estimates is principally in absolute time, the minimum number of satellites having the smallest line-of-sight velocities is preferably selected.

Figure 7:
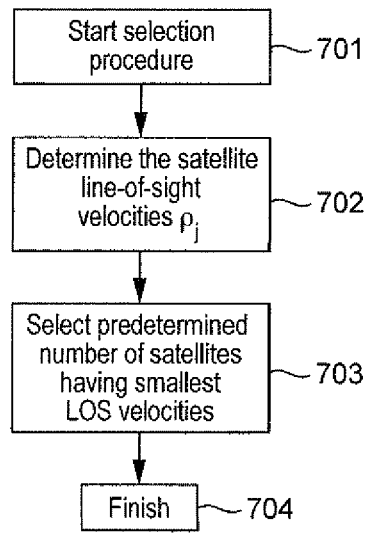
FIG. 7 illustrates the steps of a method for selecting a satellite subset according to line-of-sight velocity.

This is illustrated in FIG. 7. Step 701 commences the procedure. In step 702, the line-of-sight velocities of the used constellation are determined from the estimate of absolute time, user location and the provided ephemeris information. In step 703, the predetermined number of satellites required for the subset having the smallest line-of-sight velocities are identified and selected to be used in the location calculation. The procedure concludes in step 704.

Selecting Satellites in Dependence on a Convergence Zone

The apparatus may also be arranged to select which satellites to use by considering the convergence zones associated with the satellites in the visible constellation. Two examples of approaches that can be taken to considering the convergence zones are described below. The first is simple, approximate and yields almost the same result as the second. The second is more involved and involves slightly more processing but is the full solution. It is also of interest as it allows graphical display of zones of convergence. Both approaches are applicable to scenarios in which there is uncertainty in the initial position estimate.

(i) Straightforward Treatment of the Convergence Zone

Figure 8:
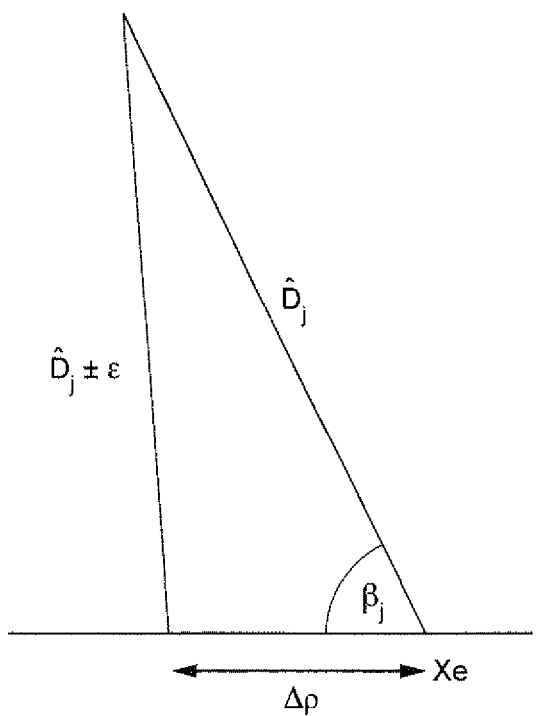
FIG. 8 illustrates an example of a convergence zone.

Consider the sketch shown in FIG. 8. The diagram is drawn in the plane containing the vector to the satellite. The distance to the $j^{th}$ satellite from the estimated position of the receiver is $\hat{D}_j$, the error in absolute time (expressed as a distance) is $\epsilon$. The satellite is at elevation $\beta_j$ and the distance along the Earth's surface from the initial estimated position ($x_e$) is $\Delta p$.

Applying the cosine rule to the triangle in FIG. 8 and using the standard equation for solving quadratics gives, with rearrangement and expansion:

$$\Delta p = \sqrt{\left[\hat{D}_j \cos \beta_j\right]^2 + 2\hat{D}_j \epsilon + \epsilon^2} - \hat{D}_j \cos \beta_j \approx \frac{\epsilon}{\cos \beta_j} \quad (16)$$

To the first order, the distance from the initial position is the same but in the opposite direction if c is negative. The linearization has introduced the possibility of a divergent $\Delta p$ when the satellite is directly overhead. The minimum permitted user position error is therefore inversely proportional to $\cos \beta_j$, which means that the permitted user position error is larger for satellites with larger elevation angles. A simple but effective way to select the best subset is to choose those satellites that have the largest elevation angles.

(ii) Selecting Satellites in Dependence on Elevation Angle

Figure 9:
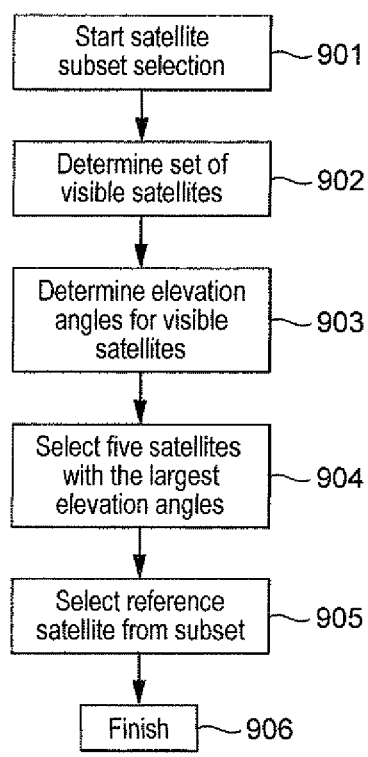
FIG. 9 illustrates the steps of a method for selecting a satellite subset according to elevation angle.

An example of such an algorithm is illustrated in FIG. 9. The algorithm starts in step 901. In step 902, the set of visible satellites is determined. In step 903, the elevation angle from the receiver to each of the satellites in the visible set is determined. In step 904, the predetermined number of satellites having the largest elevation angle is selected as the satellite subset. In step 905, the reference satellite is selected from the subset. The process then terminates in 906.

The Dilution of Precision (DOP) for a subset of satellites selected to have the largest elevation will tend to be poor (that is, large in value), as the satellites are likely to be grouped together, but this does not typically damage the algorithm to find the receiver's location and absolute time. A location solution may be determined using either a direct or least squares solution using single differences, as described above. The solution will typically have the largest possible error tolerance for receiver position errors due to the increased convergence zone. However, due to the poor dilution of precision, the sensitivity to measurement errors will be relatively high. During an early iteration of the algorithm, however, these measurement errors will be small compared to the receiver position error. Therefore, a subset that maximizes the convergence zone at the expense of sensitivity to measurement errors may be advantageously utilized during early iterations, to be later replaced by a subset of the available satellite constellation, or the complete constellation, with lower sensitivity to measurement errors once the receiver position has been estimated closer to the receiver's actual position.

During the later iterations, all the visible satellite signal measurements above the receiver's elevation mask angle may be used rather than just a subset of those measurements. A new reference satellite may be chosen and one of procedures described above, normally using a least squares method, may be employed with the revised absolute time and estimate of user location, as determined from the first iteration, to form a high precision solution for GPS time and user location. The first (coarse) estimate has a higher relatively inaccuracy but also a large convergence zone due to the selection of the high elevation satellites only. In the second iteration, a large convergence zone is not required as estimates of user location and absolute time have been determined from the first iteration with sufficient accuracy to fall within the convergence zone determined by the complete constellation. In the second location iteration step, the Dilution of Precision is reduced due to the inclusion of satellites with lower elevation angles and the resulting solution accuracy is thereby improved.

The derivation of equation (16) is a simplified method that involves linearization and discounts the curvature of the Earth. These approximations may not be used in more complex derivations, an example of which is described below.

(iii) Complex Derivation of the Convergence Zone

Figure 10:
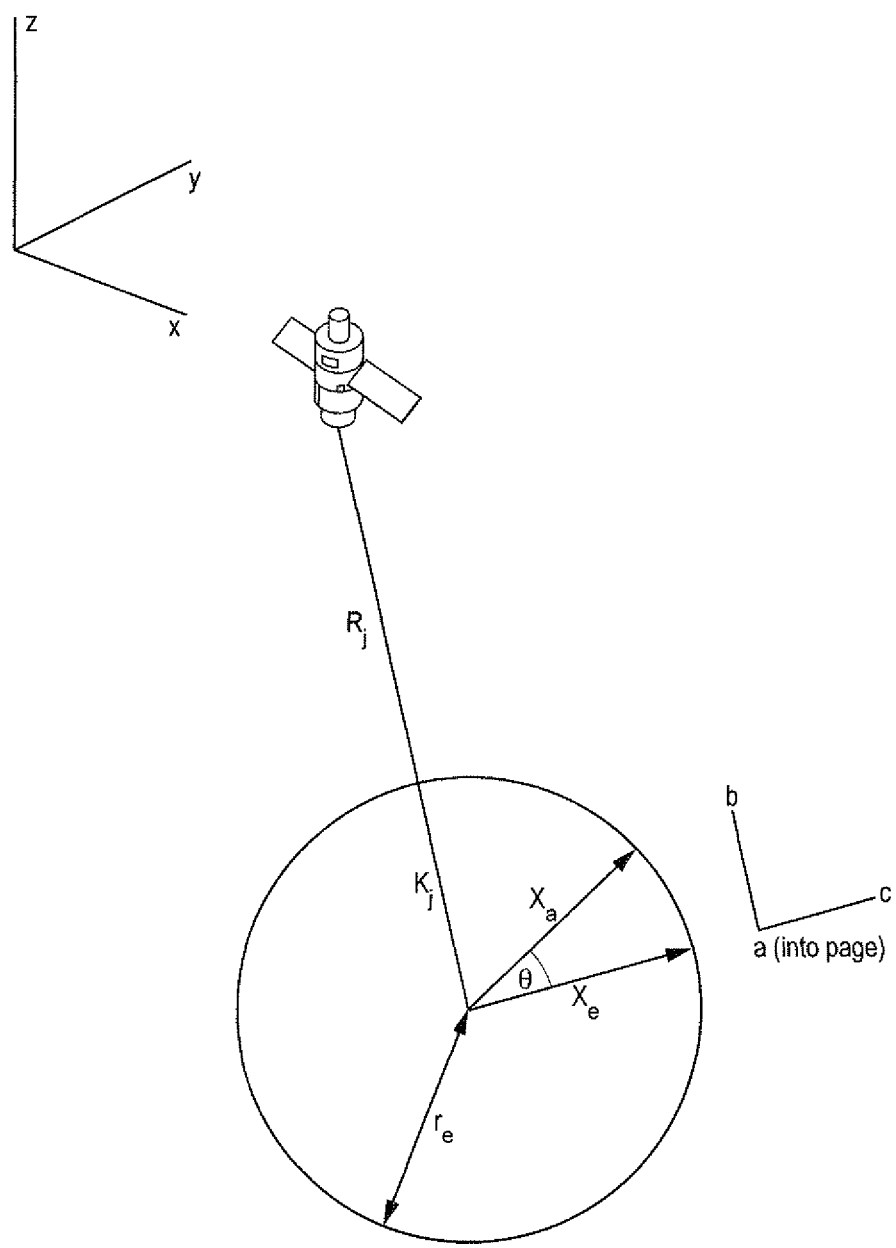
FIG. 10 illustrates an example of a convergence zone.

FIG. 10 illustrates a receiver and a satellite in their estimated locations relative to the Earth. FIG. 10 helps to illustrate the following derivation of a convergence zone associated with a particular satellite, j, which takes into account the curvature of the Earth. Definitions of the terms used in the derivation, some of which are also shown in the figure, are listed below:

a, b and c form a Right Handed Set of unit vectors in the estimated local tangent plane with convention that b is positive in the z-direction. The origin of the {abc} coordinate system is at the estimated user position, $x_e$. The position of $x_e$ is assumed to be on the surface of the Earth at zero altitude, i.e. at a distance of from the centre of the Earth.

X, Y and Z form another right handed set of unit vectors in an ECEF coordinate frame with the centre of the Earth as origin, X along the direction to the Greenwich meridian, Z along the rotational axis and Y axis completing the coordinate set. The XY plane coincides with the equatorial plane.

$R_j$ is a vector from the centre of the Earth to satellite j. $|R_j|=r_j$ $x_e$ is a vector from the centre of the Earth to the estimated receiver position.

$x_a$ is a vector from the centre of the Earth to the (unknown) actual receiver position.

$\theta$ is the angle between the estimated position of the receiver and the actual receiver position.

$\hat{D}_j=|R_j-x_e|$ is the estimated distance between the receiver and the satellite.

$k_j$ is a unit vector from the centre of the Earth to the satellite j.

$r_e$ is the radius of the Earth.

Equation (14), which defines the total resolved error between estimated and actual satellite to user range along the line-of-sight between the receiver and the satellite, is repeated below:

$$\epsilon_{LOS,j} = \dot{p}_j t_s + p_{RX} \cos(\phi_j) \leq \frac{\lambda_c}{2} \quad (14)$$

The error that can be tolerated in the original estimates of position and absolute time on each satellite before rounding errors occur is approximately:

$$\epsilon_{j,max} = \frac{\lambda_c}{2} - |\dot{p}_j| t_{s,max} \quad (17)$$

where $\lambda_c$ is the distance between repetitive signalling events (which is approximately 300 km for GPS C/A code epochs, which travel at the speed of light at 1 ms time intervals), $\dot{p}_j$ is the line-of-sight velocity of the satellite and $t_{s,max}$ the maximum expected error in the estimate of absolute time.

The distance between the actual and estimated receiver positions on the receiver's local tangent plane $\epsilon$ can also be calculated from the geometry illustrated in FIG. 10:

$$\epsilon_j = |R_j - x_a| - |R_j - x_e| \quad (18)$$

This equation represents the difference in transit time between the measured and estimated ranges and should not exceed $\epsilon_{j,max}$ from equation (17) if the algorithm is to converge on the correct receiver location, that is, if the algorithm is to operate within the convergence zone.

The sign of $\epsilon_{j,max}$ may be positive or negative, depending on whether the distance from the actual user position is closer to or further away from the satellite than the estimated position.

The apparatus may be arranged to process these equations to establish the locus of possible actual receiver locations along which the distance between the receiver's estimated and actual locations differs by $\epsilon_{j,max}$. This locus of possible receiver locations may be derived as follows.

First, define a unit vector in the 'a b' plane, at an angle $\alpha$ to the 'a' unit vector (latitude):

$$u = \cos\alpha \cdot a + \sin\alpha \cdot b \tag{19}$$

The actual receiver location can then be expressed as:

$$x_\alpha = r_e \cos\theta \cdot c + r_e \sin\theta \cdot u \tag{20}$$

in which $0 \le \theta \le \pi$ and $|x_\alpha| = r_e$ for all $\theta$ since u and c are orthogonal.

Equation (20) represents a vector $x_\alpha$ with an angular separation of $\theta$ at the centre of the Earth measured from the origin of the local tangent plane coordinate system along the unit vector u and at approximately the same ECEF altitude as the initially estimated receiver position. In most applications, $\theta$ will not normally exceed 0.1 radians (equivalent to a distance from $x_\alpha$ to $x_e$ of 600 km).

Rearranging and squaring (19) and substituting (20) yields:

$$\frac{r_j^2 + r_e^2 - (\varepsilon_{j,max} + \hat{D}_j)^2}{2r_e r_j} = (k_j, c)\cos\theta + (k_j, u)\sin\theta \tag{21}$$

Let:

$$M = \frac{r_j^2 + r_e^2 - (\varepsilon_{j,max} + \hat{D}_j)^2}{2r_e r_j}$$

$$N = k_j, c$$

$$P(\alpha) = k_j, u$$

Squaring (21) and using (19) gives:

$$[P(\alpha)^2 + N^2]\cos^2\theta - 2MN\cos\theta + M^2 - P^2(\alpha) = 0 \tag{22}$$

Defining:

$$A = [P(\alpha)^2 + N^2]$$

$$B = -2MN$$

$$C = M^2 - P^2(\alpha)$$

This yields two potential solutions for position error that can be tolerated, only one of which is the true solution:

$$\epsilon_j r_e \cos^{-1}((-B \pm \sqrt{B^2 - 4AC})/2A) \tag{23}$$

Since $\theta$ ranges from 0 to $\pi$, there is no ambiguity in the inverse cosine. However, solutions to (23) do not exist if the discriminant is negative. If a solution does exist, it is still necessary to distinguish the correct one of the two candidate solutions. This may be achieved by rearranging equation (18) and using it to calculate $\epsilon$ in accordance with the following equation:

$$\epsilon_{j,max} = \sqrt{\hat{D}_j^2 - 2r_e r_j [N(\cos\theta - 1) + P(\alpha)\sin\theta]} - \hat{D}_j \tag{24}$$

This procedure should be repeated to determine $\pm\epsilon_{j,max}$.

Figure 13:
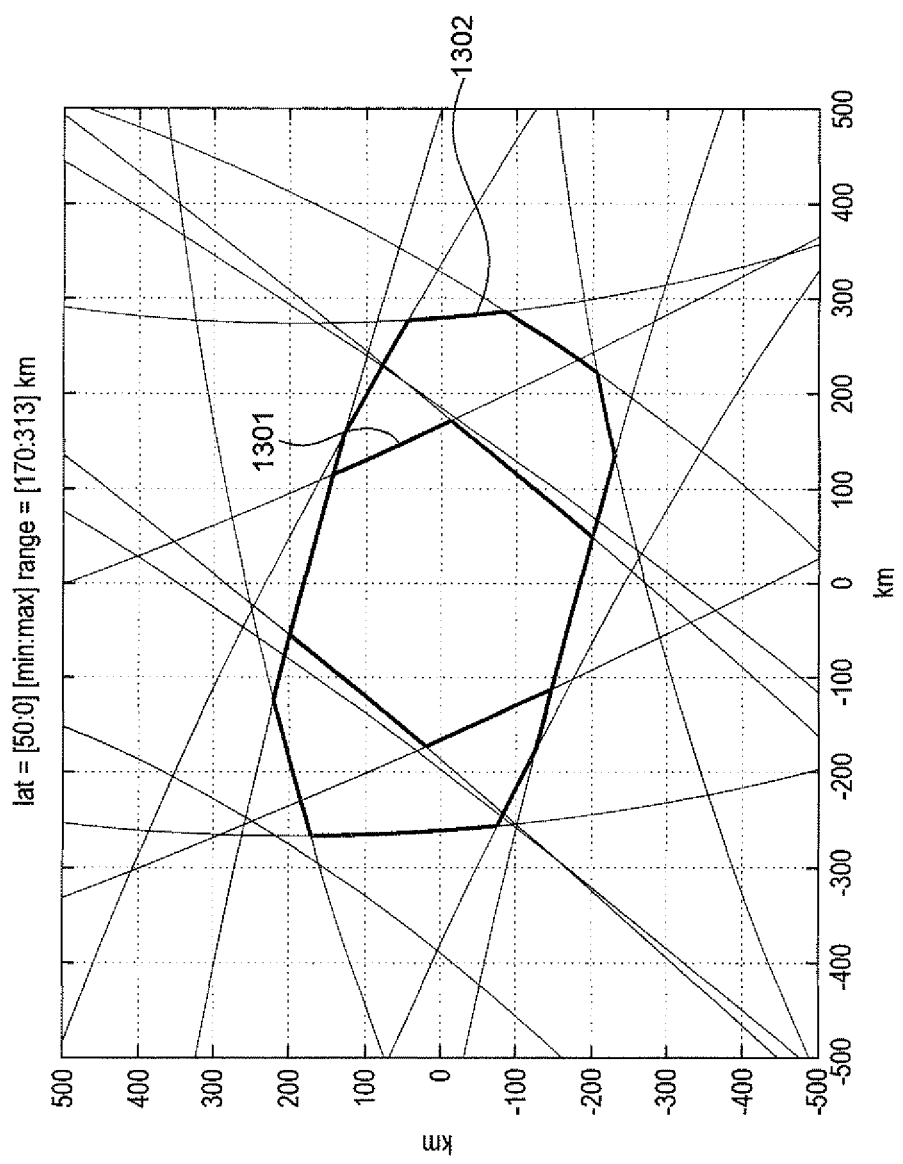
FIG. 13 illustrates examples of convergence zones.

A typical convergence zone is shown in FIG. 4. FIG. 13 shows the convergence zone itself in more detail. Each pair of essentially parallel lines in FIG. 13 defines the convergence zone associated with one particular satellite. Each time a line is crossed in this figure a further millisecond ambiguity is introduced.

FIG. 4 is a graphical representation of the convergence zones associated with six satellites. This figure confirms two of the mechanisms described above as being beneficial. First, it can be seen from the FIG. 4 that there is a tendency for the convergence zone to become smaller as the number of satellites in the visible constellation is increased. For this reason, it may be advantageous to select a minimum usable constellation of satellites (often smaller than the maximum number available) which maximizes the area of the convergence zone. Second, it can be seen that the area of the convergence zone can be maximized by selecting the high elevation satellites only (as explained above). Specifically, from equation (15), as the visible constellation includes low elevation satellites, the area inscribed by the satellite (error limit) curves becomes smaller.

(iv) Satellite Selection in Dependence on Convergence Zone

The equations above can be used by an apparatus to select a satellite subset since it is practical to evaluate them for all satellites at a reasonable spacing of $\alpha$. The satellite subset can then be chosen to either iteratively remove the point closest convergence to the initial estimate or to maximise the area of the zone.

Figure 11:
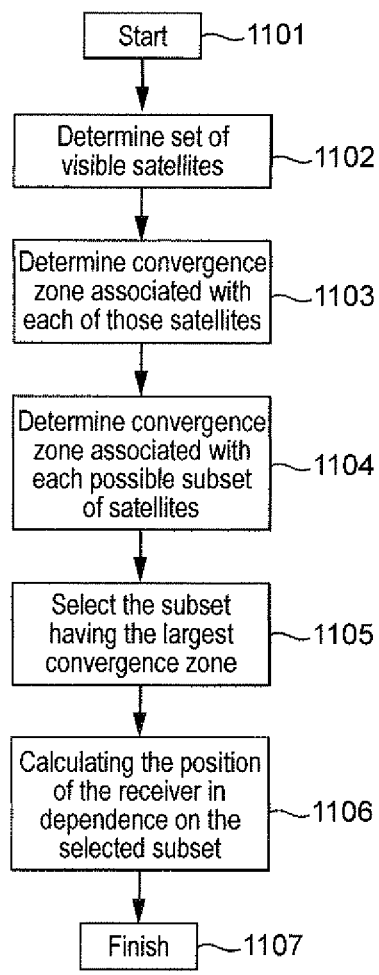
FIG. 11 illustrates the steps of a method for selecting a satellite subset according to convergence zone.

FIG. 11 illustrates a method that an apparatus might employ to select a satellite subset by maximising the area of the convergence zone. The process starts in step 1101. In step 1102 the apparatus may determine the set of visible satellites. In step 1103 the apparatus might determine a convergence zone limit associated with each of those satellites. In step 1104 the apparatus may be arranged to determine, for each potential subset that might be formed from the visible satellites, the overall convergence zone that would be associated with that subset. The apparatus may then select the subset associated with the largest convergence zone (step 1105) and calculate the location of the receiver in dependence on that subset (step 1106). The procedure finishes in step 1107.

The number of different combinations that would have to be tried to obtain an optimum subset of satellites from a particular visible constellation is easily determined. For users with a visible or useable constellation of N satellites and a required subset of only k satellites, the number of different choices is $^N C_k$ as each satellite has a distinct location. For large constellations and a minimum number of five satellites for the initial position determination, the number of possible constellation subsets is large. For example, with ten visible satellites, the number of possible subsets is 10!/5!×5!, which is 252. This number is sufficiently large for it to be computationally burdensome to search of all possible selections to find the one with the largest convergence zone.

The convergence zone can be maximized for a specific constellation through repeatedly rejecting the satellite that inscribes the smallest convergence zone around the receiver until only five satellites remain (or however many satellites are required in the subset).

Figure 12:
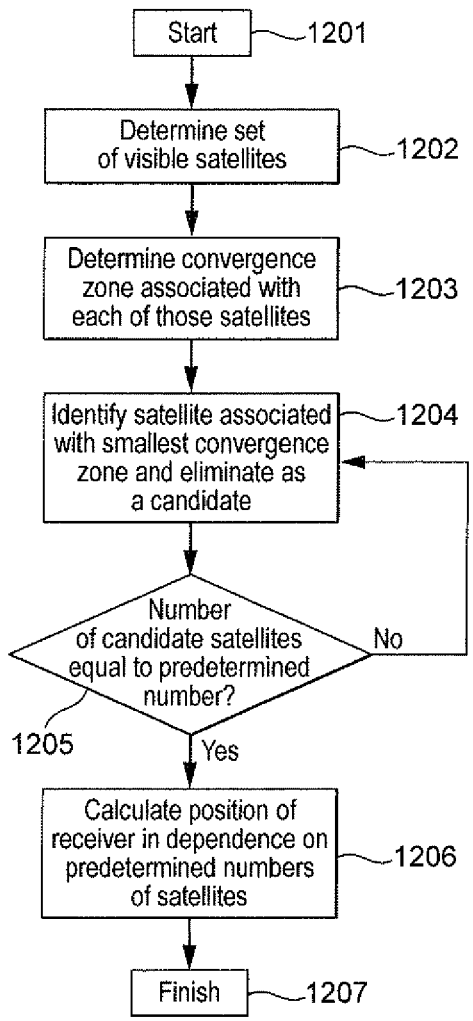
FIG. 12 illustrates the steps of a method for selecting a satellite subset according to convergence zone.

FIG. 12 illustrates a method that an apparatus might employ to select a satellite subset by maximising the area of the convergence zone. The process starts in step 1201. In step 1202 the apparatus may determine the set of visible satellites. In step 1203 the apparatus might determine a convergence zone associated each of those satellites. In step 1204, the apparatus may determine which of the satellites is associated with the smallest convergence zone and eliminate it from the set of candidates for forming the subset. The apparatus may be arranged to repeat this process until the number of satellites in the candidate set is equal to the required number (step 1205). The apparatus may then calculate the location of the receiver in dependence on the remaining subset (step 1206). The procedure finishes in step 1207.

Selection based on the progressive elimination of the satellite with the closest ambiguity limit can also dramatically reduce the computational burden. When only the minimum set of satellites remains, the resulting convergence zone should be the largest possible based on the available ambiguity limit. This can be demonstrated with reference to FIG. 4, which shows the convergence zone 402 of a six-satellite constellation. The satellite that inscribes the smallest convergence zone is represented by curve 403. By removing this satellite from consideration, the convergence zone can be extended from region 402 to region 404. The remaining five satellites are a suitable subset for maximizing the convergence zone. Another example is shown in FIG. 13, in which the convergence zone was able to be expanded from 1301 to 1302 by appropriate satellite selection.

Apparatus Example

Figure 14:
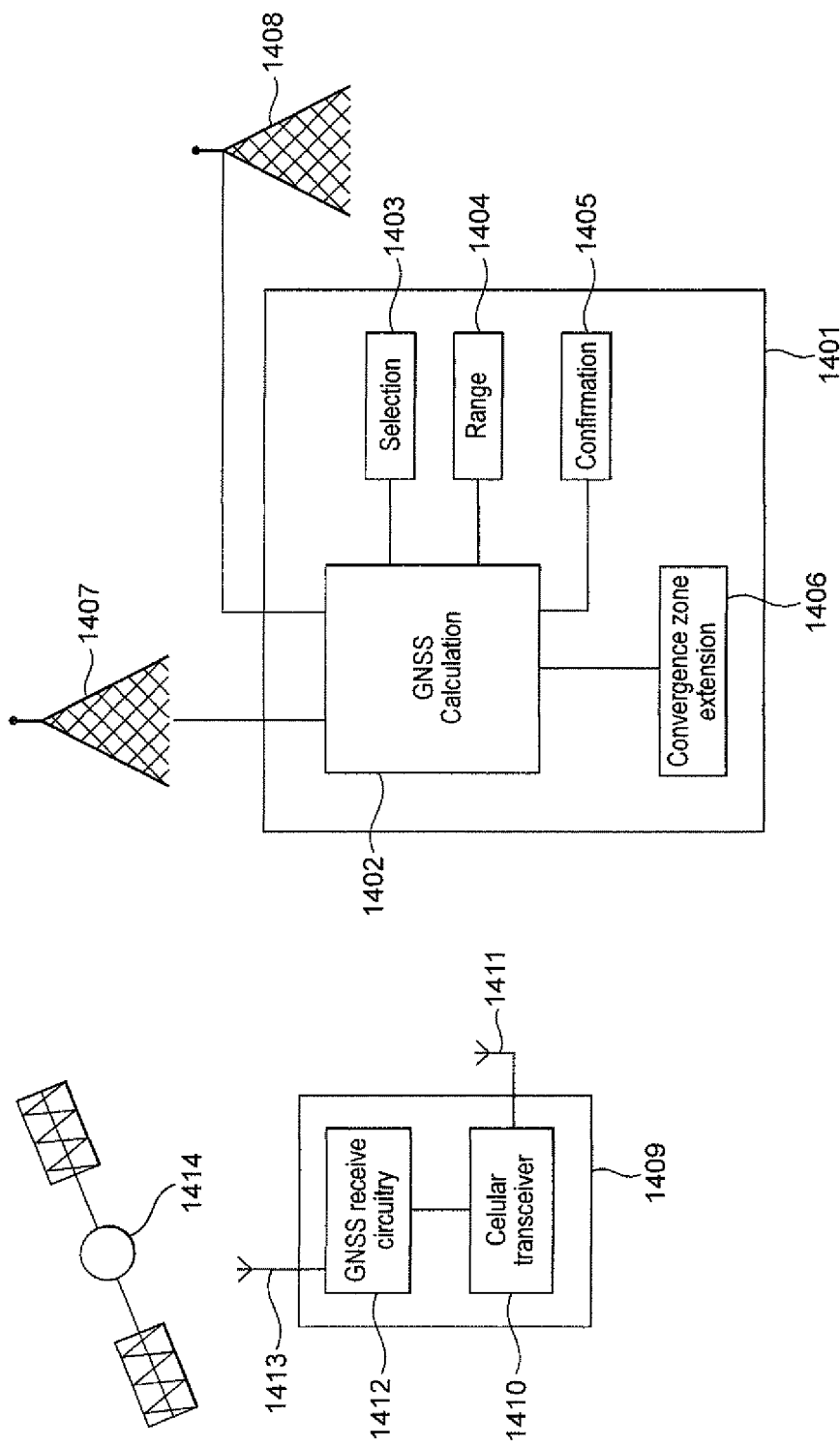
FIG. 14 illustrates an example of GNSS system.

An example of an apparatus suitable for implementing the location-determination algorithms described herein is shown generally in FIG. 14. The apparatus is shown generally at 1401. The algorithm may be implemented by a receiver or by a separate piece of apparatus, such as a server. In this example, the apparatus is located in a server that forms part of a cellular network. This is for the purposes of example only, and in other preferred embodiments the apparatus may be a handheld device.

In FIG. 14, a GNSS receiver is shown at 1409. The receiver comprises a GNSS antenna 1413 for receiving signalling events from a satellite 1414. The receiver also comprises GNSS receiver circuitry 1412 that is capable of identifying the times-of-arrival of signalling events transmitted by the satellite. The receiver may comprise a cellular transceiver 1409 and an associated antenna 1412 by means of which the receiver can transmit the measured times-of-arrival to server 1401 for processing. In this example, the server is shown as part of the cellular network and connected to radio tower 1407.

The server location calculation unit 1402 is connected to receive times-of-arrival information from the GNSS receiver via radio tower 1407 and to receive ephemeris information from radio tower 1408, which has a clear view of the sky for receiving GNSS signals from one or more satellites. The location calculation unit is also connected to a selection unit 1403, a range estimation unit 1404, a confirmation unit 1405 and a convergence zone unit 1406. The selection unit may be arranged to select the satellite subsets and the reference satellite in dependence on information passed to it by other functional units. The range estimation unit may be arranged to estimate the distances between the receiver and each of the satellites by working out the satellite positions at the current estimate of GPS time. The confirmation unit may be arranged to perform the DoP and other confirmation calculations that check the validity of the updated position and absolute time estimates generated by the algorithm. The convergence zone extension unit may be arranged to determine convergence zones associated with each of the satellites and/or angles of elevation with respect to the receiver for each the satellites.

The calculation unit is suitably arranged to maintain overall control of the algorithm by passing data between the various other functional blocks and by performing the actual location calculation. The calculation unit is preferably capable of performing a standard location calculation (linearized or otherwise) in addition to one or more of the single-difference algorithms described above.

The apparatus shown in FIG. 14 is shown illustratively as comprising a number of interconnected functional blocks. This is for illustrative purposes and is not intended to define a strict division between different parts of hardware on a chip. In practice, the apparatus preferably uses a microprocessor acting under software control for implementing the algorithms described herein. In some embodiments, the algorithms may be performed wholly or partly in hardware. It may, for some examples, be advantageous in some implementations to provide dedicated hardware for performing some of the calculations as is known in the art.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. An apparatus for calculating the location of a receiver, the apparatus including:
a global positioning system (GPS) receiver configured to receive signals from a set of satellites; and
a processor configured to:
execute a location algorithm to determine a location of the apparatus by sequentially:
selecting a subset of satellites from the set of satellites visible to the receiver in dependence on a first criterion selected from a group including a convergence zone of the algorithm, elevation angles of the satellites, line of sight velocities of the satellites, and a maximization of accuracy of the algorithm;
determining an estimated location of the apparatus based on the selected subset of satellites;
selecting a different subset of satellites from the set of satellites visible to the receiver in dependence on a second criterion different than the first criterion, the second criterion selected from the group including the convergence zone of the algorithm, the elevation angles of the satellites, the line of sight velocities of the satellites, and the maximization of accuracy of the algorithm; and
determining the location of the apparatus based on the selected different subset of satellites and based on the estimated location of the apparatus.

2. An apparatus as claimed in claim 1, wherein the apparatus is arranged to estimate the effect that using the subset or the different subset of satellites will have on the capability of the location algorithm to generate an accurate location for the receiver in dependence on a convergence zone associated with the subset or the different subset of satellites.

3. An apparatus as claimed in claim 1, wherein the location algorithm generates the receiver location in dependence on an estimated location of the receiver, the apparatus being arranged to estimate an effect that the subset or the different subset of satellites will have on the capability of the location algorithm to generate an accurate location for the receiver in dependence on an error associated with the estimated location.

4. An apparatus as claimed in claim 1, wherein the location algorithm generates the receiver location in dependence on an estimated transmission time of the received signals, the apparatus being arranged to estimate the effect that the subset or the different subset of satellites will have on the capability of the location algorithm to generate an accurate location for the receiver in dependence on an error associated with the estimated transmission time.

5. An apparatus as claimed in claim 1, wherein the apparatus is arranged to, select the subset of satellites to comprise a first number of satellites and to select the different subset of satellites to comprise a second number of satellites, said second number being higher than said first number.

6. An apparatus as claimed in claim 1, wherein the apparatus is arranged to select the subset of satellites to be the subset associated with the maximum convergence zone achievable by means of the constellation of visible satellites.

7. An apparatus as claimed in claim 1, wherein the apparatus is arranged to select the subset of satellites to be associated with a larger convergence zone than the different subset of satellites.

8. An apparatus as claimed in claim 1, wherein the apparatus is arranged to select the different subset of satellites to generate a more accurate location for the receiver than the subset of satellites.

9. An apparatus as claimed in claim 1, wherein the apparatus is arranged to select the subset or the different subset of satellites by:
   forming a candidate subset comprising satellites that are visible to the receiver;
   repeatedly identifying which of the satellites in the candidate subset is associated with the smallest convergence zone and eliminating that satellite from the candidate subset until the candidate subset consists of a predetermined number of satellites; and
   selecting the subset or the different subset of satellites to comprise the predetermined number of satellites in the candidate subset.

10. An apparatus as claimed in claim 1, wherein the apparatus is arranged to select the subset or the different subset of satellites by:
    identifying one or more candidate subsets of satellites that could be formed from the constellation of satellites visible to the receiver and used to calculate a location for the receiver;
    determining a convergence zone associated with each of the candidate subsets; and
    selecting the subset or the different subset of satellites to comprise the candidate subset associated with the largest convergence zone.

11. An apparatus as claimed in claim 1, wherein the apparatus is arranged to select the subset or the different subset of satellites to consist of a predetermined number of satellites in the set of visible satellites that have the highest levels of elevation relative to the receiver.

12. An apparatus as claimed in claim 1, wherein the apparatus is arranged to select the subset or the different subset of satellites to consist of a predetermined number of satellites in the set of visible satellites that have the lowest line-of-sight velocities.

13. An apparatus as claimed in claim 12, wherein the apparatus is arranged to designate one satellite within the set of satellites as a reference satellite.

14. A method for calculating the location of a device, the method including:
    receiving, by a global positioning system (GPS) receiver of the device, signals from a set of satellites;
    executing, by a processor of the device, an algorithm to determine a location of the device by sequentially:
       selecting a subset of satellites from the set of satellites visible to the receiver in dependence on a first criterion selected from a group including a convergence zone of the algorithm, elevation angles of the satellites, line of sight velocities of the satellites, and a maximization of accuracy of the algorithm;
       determining an estimated location of the device based on the selected subset of satellites;
       selecting a different subset of satellites from the set of satellites visible to the receiver in dependence on a second criterion different than the first criterion, the second criterion selected from the group including the convergence zone of the algorithm, the elevation angles of the satellites, the line of sight velocities of the satellites, and the maximization of accuracy of the algorithm; and
       determining the location of the device based on the selected different subset of satellites and based on the estimated location of the device.

15. A non-transitory computer-readable medium encoded with instructions, that when executed by an apparatus:
    configures a processor of the apparatus to execute an algorithm to determine a location of the apparatus by sequentially:
       selecting a subset of satellites from a set of satellites transmitting signals to a global positing system (GPS) receiver in the apparatus, the selection of the subset being in dependence on a first criterion selected from a group including a convergence zone of the algorithm, elevation angles of the satellites, line of sight velocities of the satellites, and a maximization of accuracy of the algorithm;
       determining an estimated location of the apparatus based on the selected subset of satellites;
       selecting a different subset of satellites from the set of satellites visible to the receiver in dependence on a second criterion different than the first criterion, the second criterion selected from the group including the convergence zone of the algorithm, the elevation angles of the satellites, the line of sight velocities of the satellites, and the maximization of accuracy of the algorithm; and
       determining the location of the apparatus based on the selected different subset of satellites and based on the estimated location of the apparatus.

* * * * *